(12) United States Patent
Hong et al.

(10) Patent No.: US 11,156,879 B2
(45) Date of Patent: *Oct. 26, 2021

(54) LIQUID CRYSTAL DISPLAY DEVICE

(71) Applicant: Samsung Display Co., Ltd., Yongin-si (KR)

(72) Inventors: Ki Pyo Hong, Hwaseong-si (KR); Wan Namgung, Asan-si (KR); Woo Sung Sohn, Seoul (KR); Ki Won Park, Asan-si (KR); Seung Kyu Lee, Cheonan-si (KR); In Woo Kim, Asan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/941,398

(22) Filed: Jul. 28, 2020

(65) Prior Publication Data

US 2020/0355950 A1 Nov. 12, 2020

Related U.S. Application Data

(63) Continuation of application No. 15/978,177, filed on May 13, 2018, now Pat. No. 10,761,378.

(30) Foreign Application Priority Data

Nov. 28, 2017 (KR) .................. 10-2017-0159979

(51) Int. Cl.
*G02F 1/1339* (2006.01)
*G02F 1/1335* (2006.01)
(Continued)

(52) U.S. Cl.
CPC .......... *G02F 1/1339* (2013.01); *G02F 1/1368* (2013.01); *G02F 1/13394* (2013.01);
(Continued)

(58) Field of Classification Search
CPC ............ G02F 1/1339; G02F 1/133512; G02F 1/133514; G02F 1/133602;
(Continued)

(56) References Cited

U.S. PATENT DOCUMENTS 8,294,868 B2 10/2012 Lee
8,531,641 B2 9/2013 Lee et al.
(Continued)

FOREIGN PATENT DOCUMENTS

KR 10-0846980 7/2008
KR 10-2009-0002629 1/2009
(Continued)

OTHER PUBLICATIONS

A Non-Final Office Action dated Oct. 21, 2019, in U.S. Appl. No. 15/978,177.
(Continued)

*Primary Examiner* — Dung T Nguyen
(74) *Attorney, Agent, or Firm* — H.C. Park & Associates, PLC

(57) ABSTRACT

A liquid crystal display device including a display area, a non-display area surrounding the display area and including a first non-display area disposed on a first side, in a first direction, of the display area and a second non-display area disposed on a second side, in the first direction, of the display area, a first substrate including a first base and a plurality of spacers that are disposed on a first surface of the first base, a second substrate disposed on the first substrate, and a liquid crystal layer disposed between the first and second substrates. The spacers include first spacers, having a first thickness, disposed in the non-display area and second spacers, having a second thickness greater than the first thickness, disposed in the non-display area. A number of second spacers disposed in a first non-display area is dif-
(Continued)

ferent from a number of second spacers disposed in a second non-display area.

20 Claims, 17 Drawing Sheets

(51) Int. Cl.
*G02F 1/1337* (2006.01)
*G02F 1/1368* (2006.01)
*G02F 1/1343* (2006.01)
*G02F 1/13357* (2006.01)
*G02F 1/1333* (2006.01)

(52) U.S. Cl.
CPC .. *G02F 1/133514* (2013.01); *G02F 1/133602* (2013.01); *G02F 1/133707* (2013.01); *G02F 1/134309* (2013.01); *G02F 1/13396* (2021.01); *G02F 1/133388* (2021.01); *G02F 2201/121* (2013.01); *G02F 2201/123* (2013.01)

(58) Field of Classification Search
CPC ......... G02F 1/133707; G02F 1/134309; G02F 1/1368; G02F 1/133388
See application file for complete search history.

(56) References Cited

U.S. PATENT DOCUMENTS

| | | | |
|---|---|---|---|
| 10,761,378 B2* | 9/2020 | Hong | ............... G02F 1/133514 |
| 2009/0009698 A1 | 1/2009 | Moon et al. | |
| 2017/0038636 A1 | 2/2017 | Yu | |
| 2017/0110477 A1 | 4/2017 | Han et al. | |
| 2018/0088405 A1 | 3/2018 | Nagasawa | |

FOREIGN PATENT DOCUMENTS

| | | |
|---|---|---|
| KR | 10-1097333 | 12/2011 |
| KR | 10-1127588 | 3/2012 |
| KR | 10-1189155 | 11/2012 |
| KR | 10-2017-0045414 | 4/2017 |

OTHER PUBLICATIONS

A Notice of Allowance dated Apr. 30, 2020, in U.S. Appl. No. 15/978,177.

* cited by examiner

LIQUID CRYSTAL DISPLAY DEVICE

CROSS REFERENCE TO RELATED APPLICATION

This application is a Continuation of U.S. patent application Ser. No. 15/978,177, filed on May 13, 2018, and claims priority from the benefit of Korean Patent Application No. 10-2017-0159979, filed on Nov. 28, 2017, each of which is hereby incorporated by reference for all purposes as if fully set forth herein.

BACKGROUND

Field

Exemplary embodiments of the invention relate generally to a liquid crystal display (LCD) device.

Discussion of the Background

Display devices have increasingly become important in accordance with developments in multimedia technology. Accordingly, various types of display devices such as a liquid crystal display (LCD) device, an organic light-emitting display device, etc. have been used.

The LCD device includes: an LCD panel having field-generating electrodes such as pixel electrodes and a common electrode and a liquid crystal layer in which an electric field is generated by the field-generating electrodes; and a backlight unit providing light to the LCD panel. The LCD device displays an image by applying voltages to the field-generating electrodes to realign liquid crystal molecules in the liquid crystal layer and thus to control the amount of light passing through the liquid crystal layer for each pixel.

If the distance between the upper and lower substrates of the LCD device fails to be uniformly maintained, the liquid crystal layer cannot be uniformly formed, and as a result, defects such as light leakage and stains may be generated. For example, if the edges of the upper or lower substrate are sagged by the weight of the upper or lower substrate, bright or dark spots may become visible on the edges of the LCD device. These defects may become more apparent as the LCD device becomes larger in size. Thus, the maintenance of the distance between the upper and lower substrates of the LCD device is one of the most important factors determining the display quality of the LCD device.

The above information disclosed in this Background section is only for understanding of the background of the inventive concepts, and, therefore, it may contain information that does not constitute prior art.

SUMMARY

Display devices constructed according to exemplary embodiments of the invention are capable of suppressing the occurrence of defects such as stains on the edges thereof so as to improve display quality.

Additional features of the inventive concepts will be set forth in the description which follows, and in part will be apparent from the description, or may be learned by practice of the inventive concepts.

According to an exemplary embodiment of the invention, there is provided a liquid-crystal display device. The liquid crystal display (LCD) device includes a display area, a non-display area surrounding the display area and including a first non-display area disposed on a first side, in a first direction, of the display area and a second non-display area disposed on a second side, in the first direction, of the display area, a first substrate including a first base and a plurality of spacers disposed on a first surface of the first base, a second substrate disposed on the first substrate, and a liquid crystal layer disposed between the first and second substrates. The spacers include, first spacers disposed in the non-display area and have a first thickness and second spacers disposed in the non-display area, have a second thickness that is greater than the first thickness, and comprise the same material as the first spacers. A number of second spacers disposed in the first non-display area is different from a number of second spacers disposed in a second non-display area.

In an exemplary embodiment, the first substrate may further include a color conversion pattern layer that may be disposed between the first base and the spacers, the color conversion pattern layer may include first color conversion patterns that may selectively transmit a first color through the first color conversion patterns, second color conversion patterns that may selectively transmit a second color different from the first color through the second color conversion patterns, and third color conversion patterns that may selectively transmit a third color having a shorter peak wavelength than the first color and second color through the third color conversion patterns, and the first color conversion patterns, the second color conversion patterns, and the third color conversion patterns may form repeating units that may be arranged one after another in the first direction.

In an exemplary embodiment, the first color conversion patterns and the second color conversion patterns may be disposed in the non-display area, and the third color conversion patterns may be not disposed in the non-display area.

In an exemplary embodiment, the third color conversion patterns may be disposed at an end of the display area on the first side in the first direction, the first color conversion patterns may be disposed at an end of the display area on the second side in the first direction, a maximum thickness of the third color conversion patterns may be greater than a maximum thickness of the first color conversion patterns, and a number of second spacers disposed in the first non-display area may be smaller than a number of second spacers disposed in the second non-display area.

In an exemplary embodiment, the first color conversion patterns and the second color conversion patterns may be disposed in both the first non-display area and the second non-display area, among the first color conversion patterns and the second color conversion patterns disposed in the first non-display area, the first color conversion patterns may be positioned at an end of the first non-display area on the second side in the first direction, and among the first color conversion patterns and the second color conversion patterns disposed in the second non-display area, the second color conversion patterns may be positioned at an end of the second non-display area on the first side in the first direction.

In an exemplary embodiment, wherein among the first color conversion patterns and the second color conversion patterns disposed in the first non-display area, the first color conversion patterns may be positioned at end of the first non-display area on the first side in the first direction, and among the first color conversion patterns and the second color conversion patterns disposed in the second non-display area, the first color conversion patterns may be positioned at end of the second non-display area on the second side in the first direction.

In an exemplary embodiment, the first spacers and the second spacers both may overlap with the first color conversion patterns, and a difference between the first thickness and the second thickness may be 0.4 µm or greater.

In an exemplary embodiment, the first spacers and the second spacers both may overlap with the first color conversion patterns, and a maximum width of the first spacers may be greater than a maximum width of the second spacers.

In an exemplary embodiment, the spacers may further include third spacers that may be disposed in the display area, that may a third thickness that is greater than the second thickness, and may include the same material as the second spacers.

In an exemplary embodiment, the spacers may further include fourth spacers that may be disposed in the display area, that may have a fourth thickness that is smaller than the third thickness, and that may include the same material as the third spacers, and a difference between the first and second thicknesses may be 0.4 µm or greater.

In an exemplary embodiment, the first spacers, the second spacers, and the fourth spacers all may overlap with the first color conversion patterns, and the third spacers may overlap with the third color conversion patterns.

In an exemplary embodiment, the first substrate may further include a first overcoat layer that may be disposed between the color conversion pattern layer and the spacers, the overcoat layer may cover a bottom surface and a side surface of the first color conversion patterns overlapping with the first spacers, and the first color conversion patterns overlapping with the second spacers and the fourth spacers may be placed in contact with the second color conversion patterns.

In an exemplary embodiment, the spacers may further include fifth spacers that may be disposed in the non-display area, that may not overlap with the color conversion pattern layer, and may comprise the same material as the second spacers, the second spacers may form a second height from the first surface of the first base, and the fifth spacers may form a fifth height that is smaller than the second height from the first surface of the first base.

In an exemplary embodiment, the spacers may further include third spacers that may be disposed in the display area, and may comprise the same material as the second spacers, the first spacers may form a first height from the first surface of the first base, the second spacers may form a second height that is greater than the first height from the first surface of the first base, the third spacers may form a third height that may be greater than the second height from the first surface of the first base, and the third spacers may be placed in contact with the second substrate.

In an exemplary embodiment, a thickness of the second spacers may be 1.6 µm or greater, and in a cross section of the LCD device, cut along the first direction, one second spacer may be in the first non-display area and two second spacers may be in the second non-display area.

In an exemplary embodiment, the LCD device may further include: a sealing member bonding the first substrate and the second substrate and disposed in the non-display area, wherein the first substrate may further include a color conversion pattern layer, which is disposed between the first base and the spacers, a first overcoat layer that may be disposed between the color conversion pattern layer and the spacers, and a common electrode that may be disposed between the first overcoat layer and the spacers, the second substrate may include a second base, switching elements that may be disposed on a first surface of the second base, a second overcoat layer that may be disposed on the switching elements, and pixel electrodes that may be disposed on the second overcoat layer, and the sealing member may be placed in contact with the first and second overcoat layers.

According to another exemplary embodiment of the invention, there is provided a liquid-crystal display device. The LCD device includes a display area, a non-display area surrounding the display area and including a first non-display area disposed on a first side, in a first direction, of the display area and a second non-display area disposed on a second side, in the first direction, of the display area, a first substrate including a first base and a color conversion pattern layer disposed on a first surface of the first base, a second substrate disposed on the first substrate, and a liquid crystal layer disposed between the first and second substrates, wherein the color conversion pattern layer includes first color conversion patterns that selectively transmit a first color through the first color conversion patterns, second color conversion patterns that selectively transmit a second color different from the first color through the second color conversion patterns, and third color conversion patterns that selectively transmit a third color having a shorter peak wavelength than the first color and the second color through the third color conversion patterns. A sum of numbers of first color conversion patterns and second color conversion patterns in a first non-display area is different from a sum of numbers of first color conversion patterns and second color conversion patterns in a second non-display area.

In an exemplary embodiment, the third color conversion patterns may be disposed at an end of the display area on the first side in the first direction, the first color conversion patterns may be disposed at an end of the display area on the second side in the first direction, and the sum of the numbers of first color conversion patterns and second color conversion patterns in the first non-display area may be less than the sum of the numbers of first color conversion patterns and second color conversion patterns in the second non-display area.

According to yet another exemplary embodiment of the invention, there is provided a liquid-crystal display device. The LCD device includes a display area including a plurality of pixels, a dummy area surrounding the display area and including a plurality of dummy pixels, a first substrate including a first base and a plurality of spacers disposed on a first surface of the first base, a second substrate disposed on the first substrate, and a liquid crystal layer disposed between the first substrate and the second substrate. A number of spacers having a thickness of 1.6 µm or greater, and disposed in part of the dummy area on a first side, in a first direction, of the display area, is different from a number of spacers having a thickness of 1.6 µm or greater, and disposed in part of the dummy area on a second side, in the first direction, of the display area.

In an exemplary embodiment, the first substrate may further include a first field-generating electrode that may be disposed between the first base and the spacers, the second substrate may include a second field-generating electrode that may be spaced apart from the first field-generating electrode with the liquid crystal layer interposed in between the second field-generating electrode and the first field-generating electrode, and a minimum distance between the first field-generating electrode and the second field-generating electrode in the display area may be 2.9 µm or greater.

According to the aforementioned and other exemplary embodiments of the present disclosure, an LCD device capable of suppressing the occurrence of defects such as stains on the edges thereof so as to improve display quality can be provided.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
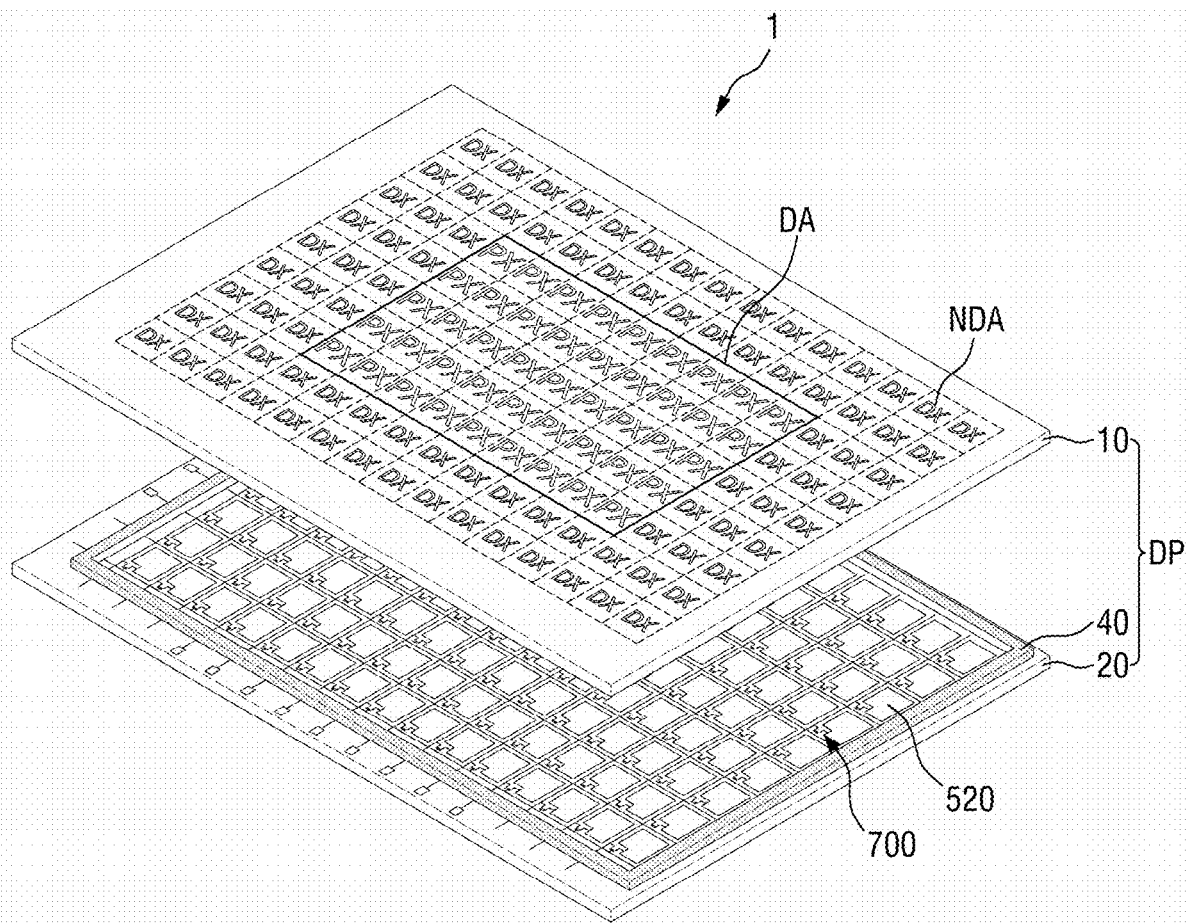
FIG. 1 is an exploded perspective view of a liquid crystal display (LCD) device according to an exemplary embodiment.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

As used herein, a first direction X1, X2 refers to a direction in a plane, a second direction Y refers to a direction intersecting the first direction X1, X2 in the plane, and a third direction Z refers to a direction perpendicular to the plane.

Exemplary embodiments of the invention will hereinafter be described with reference to the accompanying drawings.

Figure 2:
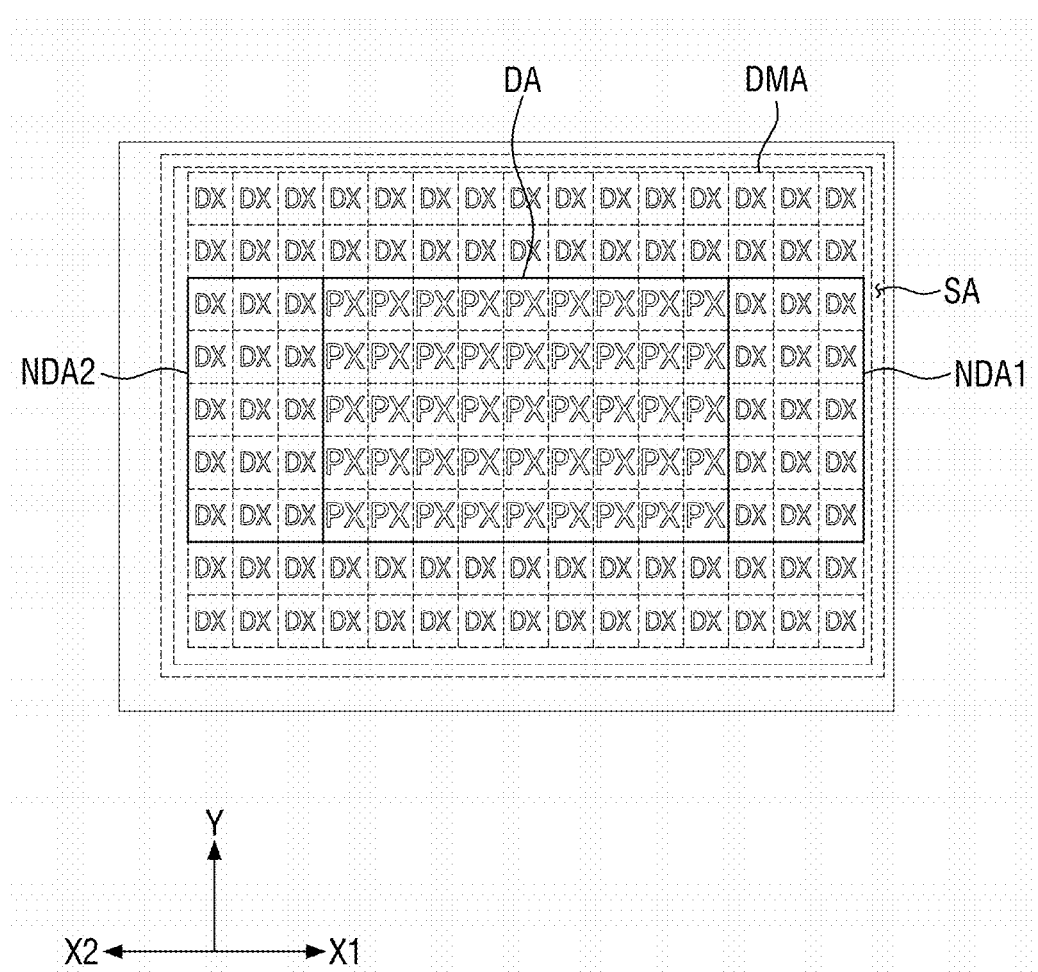
FIG. 2 is a plan view illustrating a display area and a non-display area of the LCD device of FIG. 1.

FIG. 1 is an exploded perspective view of a liquid crystal display (LCD) device according to an exemplary embodiment. FIG. 2 is a plan view illustrating a display area and a non-display area of the LCD device of FIG. 1.

Referring to FIGS. 1 and 2, an LCD device 1 includes an LCD panel DP and a backlight unit BLU.

In a plan view, the LCD device 1 and the LCD panel DP may have a substantially rectangular shape having a pair of long sides and a pair of short sides. Although not specifically illustrated, the corners of the LCD panel DP may be partially oblique or may be chamfered into a round shape. The long sides of the LCD panel DP may be substantially parallel to a first direction (X1 and X2), and the short sides of the LCD panel DP may be substantially parallel to a second direction Y. Unless otherwise defined, the term "plane," as used herein, refers to a plane that the first direction (X1 and X2) and the second direction Y belong to.

A display area DA and a non-display area NDA may be defined on the liquid crystal display panel DP. The display area DA is an area including a plurality of pixels PX through which light is effectively transmitted and substantially contributing to the actual display of an image. The term "pixel," as used herein, refers to a single area obtained by dividing the display area DA for the display of an image or colors, and one pixel may display a predetermined basic color. That is, one pixel may be a minimum unit area that can display a color independently of other pixels. Examples of the basic color include red, green, and blue, but the present disclosure is not limited thereto.

The pixels PX may include different groups of pixels PX displaying different colors. In one exemplary embodiment, the pixels PX include first pixels, which display a first color, second pixels, which display a second color having a shorter peak wavelength than the first color, and third pixels, which display a third color having a shorter peak wavelength than the second color. The first pixels, the second pixels, and the third pixels may form repeating units together, and the repeating units may be arranged one after another along the first direction (X1 and X2). The first pixels, the second pixels, and the third pixels may be alternately arranged along the second direction Y. Accordingly, the pixels PX may be arranged substantially in a matrix form in a plan view.

In a plan view, the display area DA may be surrounded by the non-display area NDA. The non-display area NDA, unlike the display area DA, may not contribute to the display of an image. In the non-display area NDA, elements for driving the LCD device 1, such as, for example, connection pads, driving circuits, and a sealing member 40, may be provided.

The non-display area NDA may include a first non-display area NDA1, which is disposed on a first side X1, in the first direction (X1 and X2), of the display area DA, and a second non-display area NDA2, which is disposed on a second side X2, in the first direction (X1 and X2), of the display area DA. That is, in an exemplary embodiment where the non-display area NDA surrounds the display area DA, part of the non-display area NDA disposed on the first side X1 is defined as the first non-display area NDA1, and part of the non-display area NDA disposed on the second side X2 is defined as the second non-display area NDA2.

In one exemplary embodiment, the non-display area NDA may include a sealing area SA in which the sealing member 40 is disposed and a dummy area DMA which is disposed on an inner side of the sealing area SA, i.e., on the display area DA's side. For example, the display area DA may be surrounded by the dummy area DMA. Also, the dummy area DMA may be surrounded by the sealing area SA. The dummy area DMA may include a plurality of dummy pixels DX.

The backlight unit BLU may be disposed below the LCD panel DP and may emit light having a particular wavelength toward the LCD panel DP. In one exemplary embodiment, the backlight unit BLU may be an edge-type backlight assembly including a light source (not illustrated), which directly emits light, and a light guide plate (not illustrated), which guides light provided by the light source and thus emits the light toward the LCD panel DP.

The light source may be a light-emitting diode (LED), an organic LED (OLED), or a laser diode (LD). In one exemplary embodiment, the light source may emit white light having red, green, and blue wavelength bands. In another exemplary embodiment, the light source may emit blue light having a single peak wavelength of about 430 nm to about 470 nm or ultraviolet (UV) light having a UV wavelength band.

The material of the light guide plate is not particularly limited as long as it has a high light transmittance. For example, the light guide plate may comprise a glass material, a quartz material, or a plastic material such as polyethylene terephthalate (PET), polyethylene methacrylate (PMMA), or polycarbonate (PC). In another exemplary embodiment, the backlight unit BLU may be a direct-type backlight assembly having no light guide plate and including a direct-type light source.

Although not specifically illustrated, one or more optical sheets (not illustrated) may be further disposed between the LCD panel DP and the backlight unit BLU. The optical sheets may include at least one of a prism sheet, a diffusion sheet, a (reflective) polarizing sheet, a lenticular lens sheet, and a micro-lens sheet. The optical sheets can improve the display quality of the LCD device 1 by modulating the optical properties (for example, condensation, diffusion, scattering, or polarization properties) of light provided by the backlight unit BLU to travel toward the LCD panel DP.

Figure 4:
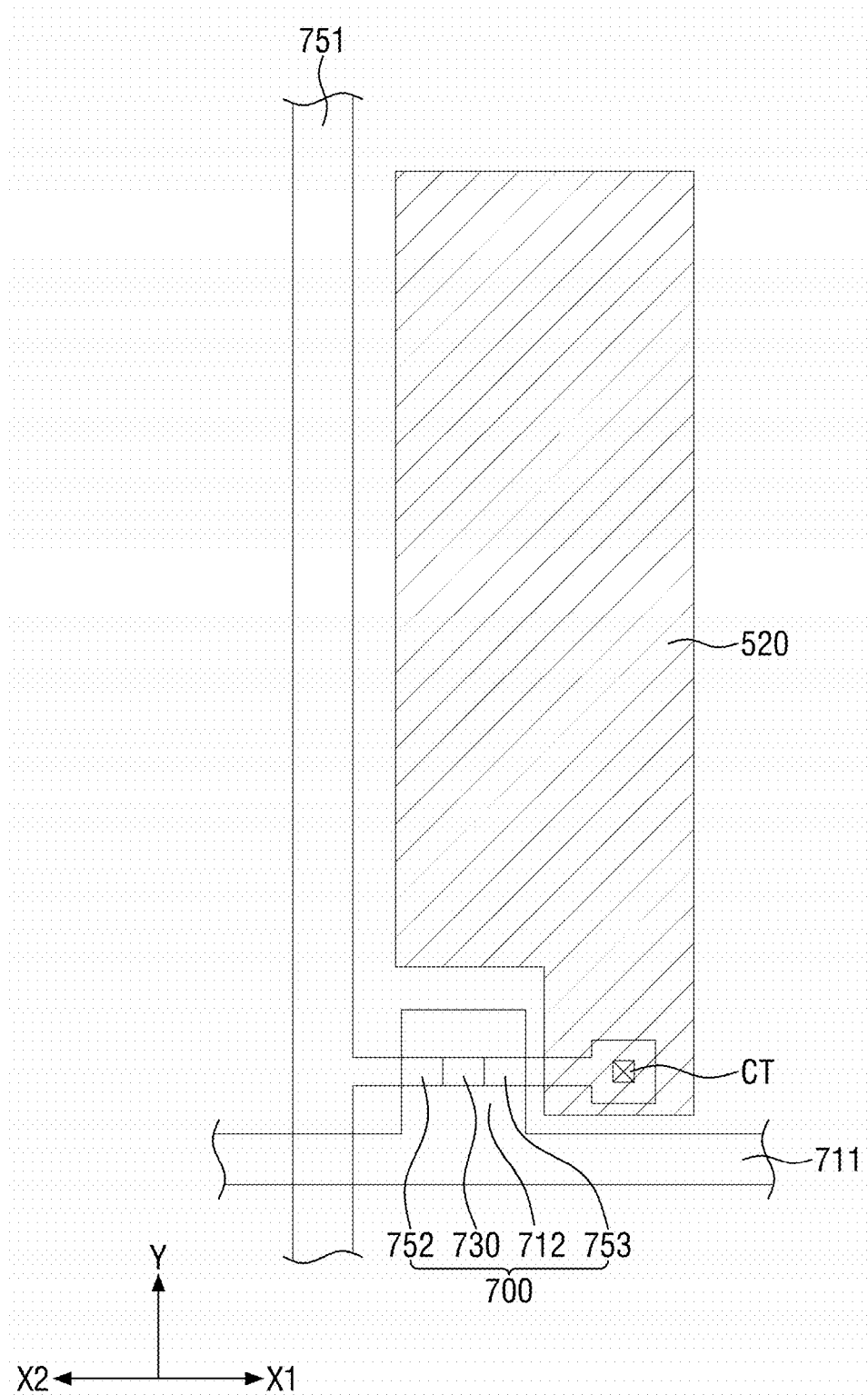
FIG. 4 is a layout view illustrating arbitrary pixels of FIG. 3.
Figure 5:
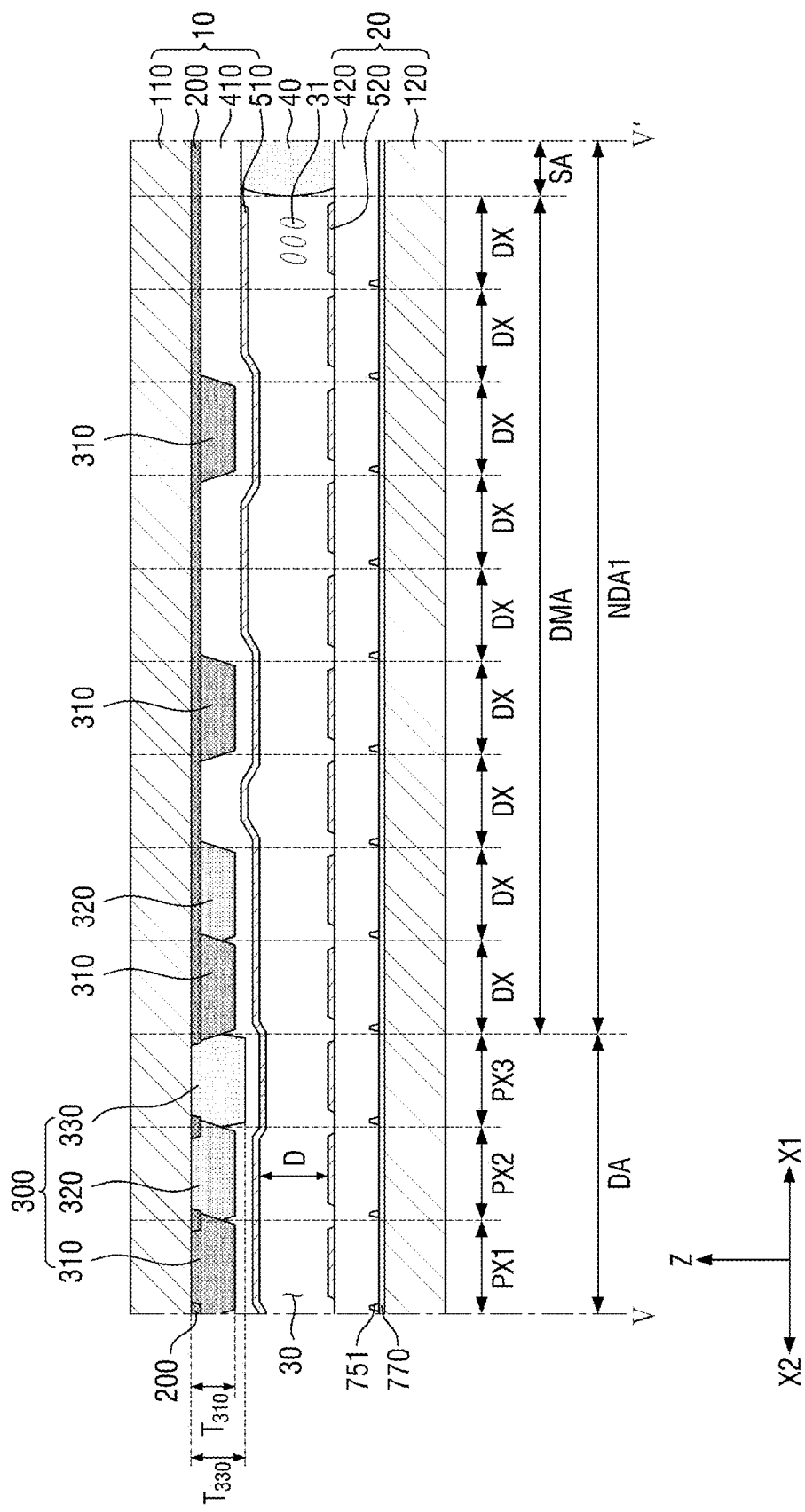
FIG. 5 is a cross-sectional view taken along line V-V of FIG. 3.

The LCD panel DP will hereinafter be described with reference to FIG. 3, FIG. 4, and FIG. 5.

Figure 3:
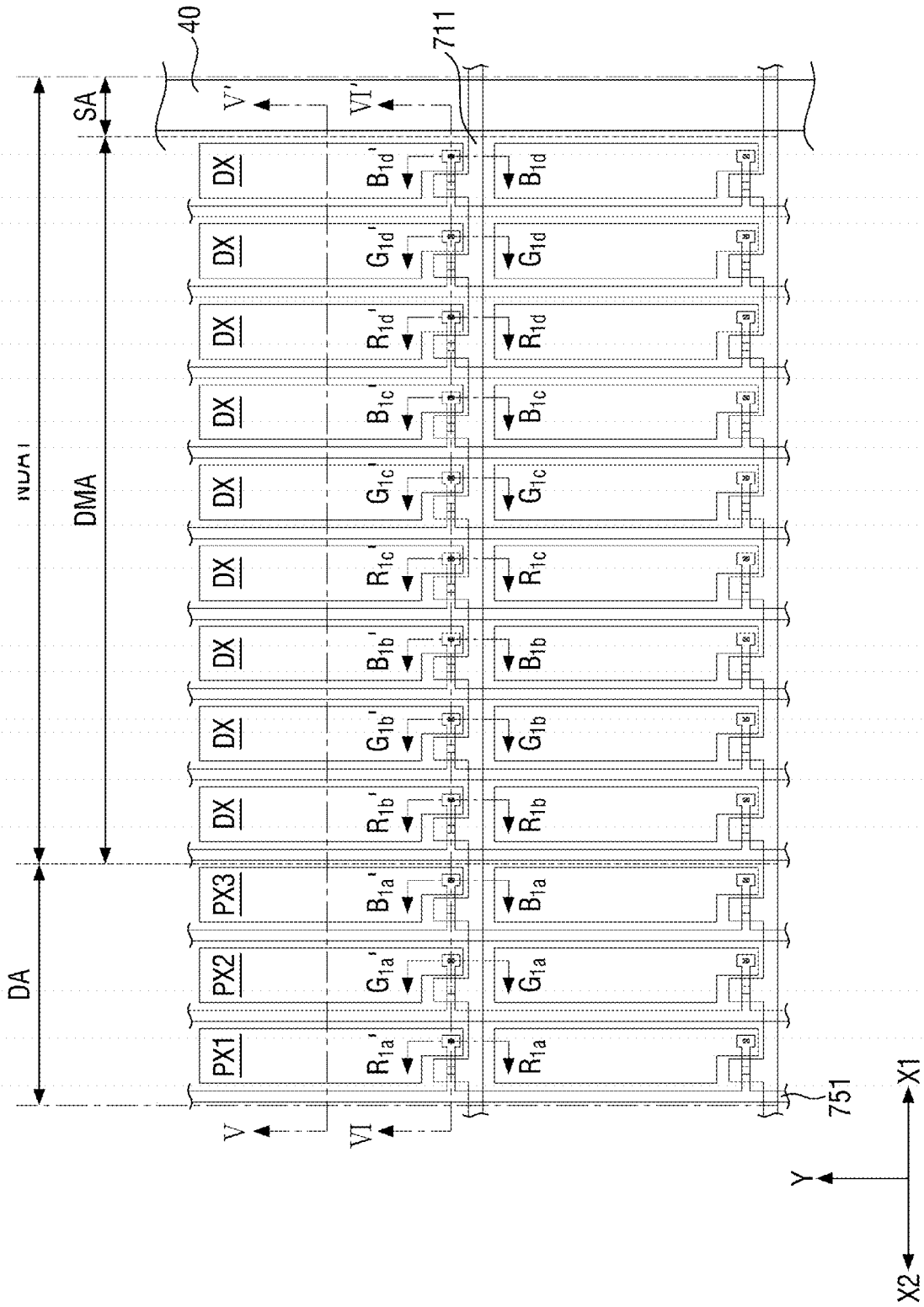
FIG. 3 is a layout view illustrating an edge portion of the LCD device of FIG. 2 on a first side in a first direction.

FIG. 3 is a layout view illustrating an edge portion of the LCD device of FIG. 2 on a first side in the first direction. In particular, FIG. 3 illustrates a boundary area between the display area DA on the first side X1 (i.e., on the right side of the LCD device 1) and the first non-display area NDA1. FIG. 4 is a layout view illustrating arbitrary pixels of FIG. 3. FIG. 5 is a cross-sectional view taken along line V-V' of FIG. 3.

Referring to FIGS. 1 through 5, the display area DA of the LCD device 1 may include first pixels PX1, which display a first color, second pixels PX2, which display a second color having a shorter peak wavelength than the first color, and third pixels PX3, which displays a third color having a shorter peak wavelength than the second color. The first pixels PX1, the second pixels PX2, and the third pixels PX3 may be sequentially arranged close to one another in the first direction (X1 and X2). The third pixels PX3 may be disposed at the end of the display area DA on the first side X1 and may adjoin the dummy area DMA.

For example, the first color may be a red color having a peak wavelength of about 610 nm to about 650 nm, the second color may be a green color having a peak wavelength of about 530 nm to about 570 nm, and the third color may be a blue color having a peak wavelength of about 430 nm to about 470 nm. However, the present disclosure is not limited to this example.

The first non-display area NDA1 and the second non-display area NDA2 may include the dummy area DMA and the sealing area SA. The dummy area DMA does not contribute to the display of an image, but in the dummy area DMA, pixel electrodes 520 and a color conversion pattern layer 300 may be disposed.

The LCD panel DP may include an upper substrate 10, a lower substrate 20 that faces the upper substrate 10, and a liquid crystal layer 30 that is interposed between the upper and lower substrates 10 and 20. The LCD panel DP may further include the sealing member 40 that bonds the upper and lower substrates 10 and 20. The liquid crystal layer 30 may be in a state of being sealed by the upper and lower substrates 10 and 20 and the sealing member 40. For example, the liquid crystal layer 30 may be disposed in the display area DA and the dummy area DMA.

The upper substrate 10 will hereinafter be described. The upper substrate 10 may include an upper base 110 and the color conversion pattern layer 300 and may further include a plurality of spacers 600.

The upper base 110 may be a transparent substrate or film. For example, the upper base 110 may comprise a glass material, a quartz material, or a light-transmitting plastic material. In some exemplary embodiments, the upper base 110 may have flexibility, and the LCD device 1 may be a curved LCD device.

Light-blocking patterns 200 may be disposed on the rear surface (i.e., the bottom surface in FIG. 5) of the upper base 110. The light-blocking patterns 200 may be disposed in the display area DA and the non-display area NDA. For example, in the display area DA, the light-blocking patterns 200 may be located along the boundaries between the pixels PX and may prevent the occurrence of color mixing defects between the pixels PX. In the display area DA, the light-blocking patterns 200 may be substantially in a lattice shape having openings corresponding to the pixels PX, but the present disclosure is not limited thereto. In the non-display area NDA, the light-blocking patterns 200 may be disposed across the dummy area DMA and the sealing area SA. The light-blocking patterns 200 may cover the non-display area NDA and may thus prevent unnecessary light leakage from occurring due to the penetration of the LCD panel DP, through the non-display area NDA, by light provided by the backlight unit BLU. The light-blocking patterns 200 may comprise an opaque metal material such as chromium (Cr) or a light-blocking colorant such as a black pigment or dye.

The color conversion pattern layer 300 may be disposed on the light-blocking patterns 200. The color conversion pattern layer 300 may be disposed across the display area DA and the non-display area NDA. The color conversion pattern layer 300 may convert light incident thereupon to have a different color from its original color. That is, light transmitted through the color conversion pattern layer 300 may be converted into light of a predetermined wavelength band.

In one exemplary embodiment, the color conversion pattern layer 300 may be a wavelength-selective optical filter blocking the transmission of light of a predetermined wavelength band and selectively transmitting light of other wavelength bands through the color conversion pattern layer 300. For example, the color conversion pattern layer 300 may be a color filter layer absorbing light of a predetermined wavelength band and selectively transmitting light of other wavelength bands through the color conversion pattern layer 300, but the present disclosure is not limited thereto. That is, in another example, the color conversion pattern layer 300 may include a wavelength shifter such as quantum dots or phosphors and may thus have a color conversion function.

The color conversion pattern layer 300 may include first color conversion patterns 310 that convert the color of light into the first color, second color conversion patterns 320 that convert the color of light into the second color, and third color conversion patterns 330 that convert the color of light into the third color. The first color conversion patterns 310 may be disposed in the first pixels PX1 in the display area DA, the second color conversion patterns 320 may be disposed in the second pixels PX2 in the display area DA, and the third color conversion patterns 330 may be disposed in the third pixels PX3 in the display area DA.

Each of the first color conversion patterns 310, the second color conversion patterns 320, and the third color conversion patterns 330 may comprise a base resin and a colorant (such as a dye or pigment) dispersed or dissolved in the base resin.

The base resin may form the shapes of the first color conversion patterns 310, the second color conversion patterns 320, and the third color conversion patterns 330. The material of the base resin is not particularly limited as long as it has a high light transmittance and has an excellent dispersion or dissolution capability for the colorant. For example, the base resin may be formed of an organic material such as an epoxy resin, an acrylic resin, a carcass resin, or an imide resin. The colorant may impart the characteristics of a wavelength-selective optical filter to each of the first, second, and third color conversion patterns 310, 320, and 330. For example, the first color conversion patterns 310 in the first pixels PX1, which display a red color, may include a red colorant allowing the transmission of only wavelength bands near the peak wavelength of a red color and absorbing other wavelength bands. Similarly, the second color conversion patterns 320 in the second pixels PX2, which display a green color, may include a green colorant, and the third color conversion patterns 330 in the third pixels PX3, which display a blue color, may include a blue colorant.

In one exemplary embodiment, a maximum thickness $T_{330}$ of the third color conversion patterns 330 may be greater than a maximum thickness $T_{310}$ of the first color conversion patterns 310 and the maximum thickness of the second color conversion patterns 320. As described above, light transmitted through the third color conversion patterns 330 may have a shorter peak wavelength than light transmitted through the first or second color conversion patterns 310 or 320. By forming the first color conversion patterns 310, the second color conversion patterns 320, and the third color conversion patterns 330 to have different thicknesses in consideration of the wavelength of light transmitted through each of the first, second, and third color conversion patterns 310, 320, and 330, the characteristics (such as color purity and luminance) of the LCD device 1 can be improved. The maximum thickness $T_{310}$ of the first color conversion patterns 310 and the maximum thickness of the second color conversion patterns 320 may be the same or may be different.

The first color conversion patterns 310, the second color conversion patterns 320, and the third color conversion patterns 330 may form repeating units, and the repeating units may be arranged one after another along the first direction (X1 and X2). As the repeating units are arranged one after another along the first direction (X1 and X2), color conversion patterns disposed at one end of the display area DA may be of a different type from color conversion patterns disposed at the other end of the display area DA. For example, the third color conversion patterns 330 may be disposed at the end of the display area DA on the first side X1 (i.e., the right side in FIG. 5) of the LCD device 1.

In some exemplary embodiments, the first color conversion patterns 310 and the second color conversion patterns 320 may be disposed in the first non-display area NDA1, but the third color conversion patterns 330 may not be disposed in the first non-display area NDA1. That is, the third color conversion patterns 330 may be disposed only in the display area DA, but the present disclosure is not limited thereto. In this case, the first color conversion patterns 310 may be disposed at both ends of the first non-display area NDA1 on the first and second sides X1 and X2 of the LCD device 1.

A first overcoat layer 410 may be disposed on the color conversion pattern layer 300. The first overcoat layer 410 may be disposed across the display area DA and the non-display area NDA. The first overcoat layer 410 may minimize level differences caused by the elements disposed on the upper base 110, such as, for example, the color conversion pattern layer 300. That is, the first overcoat layer 410 may be a level compensating layer or a planarizing layer. In some exemplary embodiments, the first overcoat layer 410 may be placed in contact with the first, second, and third color conversion patterns 310, 320, and 330 and may be further placed in contact with the upper base 110 and the light-blocking patterns 200. The material of the first overcoat layer 410 is not particularly limited as long as it has excellent planarization and light transmittance characteristics. For example, the first overcoat layer 410 may comprise an organic material such as an epoxy resin, an acrylic resin, an imide resin, a carcass resin, a siloxane resin, or a silsesquioxane resin.

A common electrode 510 may be disposed on the first overcoat layer 410. The common electrode 510 may be disposed across the pixels PX without distinction of the pixels PX, and a common voltage may be applied to the common electrode 510. The common electrode 510 may be a field-generating electrode that forms an electric field in the liquid crystal layer 30 together with the pixel electrodes 520 that will be described later. The electric field formed by the common electrode 510 and the pixel electrodes 520 can rearrange liquid crystal molecules 31 located in each of the pixels PX by controlling the behavior of the liquid crystal molecules 31. The common electrode 510 may be formed of a transparent conductive material. Examples of the transparent conductive material include indium tin oxide (ITO), indium zinc oxide (IZO), zinc oxide (ZnO), indium (III) oxide ($In_2O_3$), indium gallium oxide (IGO), and aluminum zinc oxide (AZO).

The LCD panel DP will hereinafter be described with reference to FIG. 6, FIG. 7, FIG. 8, and FIG. 9.

Figure 6:
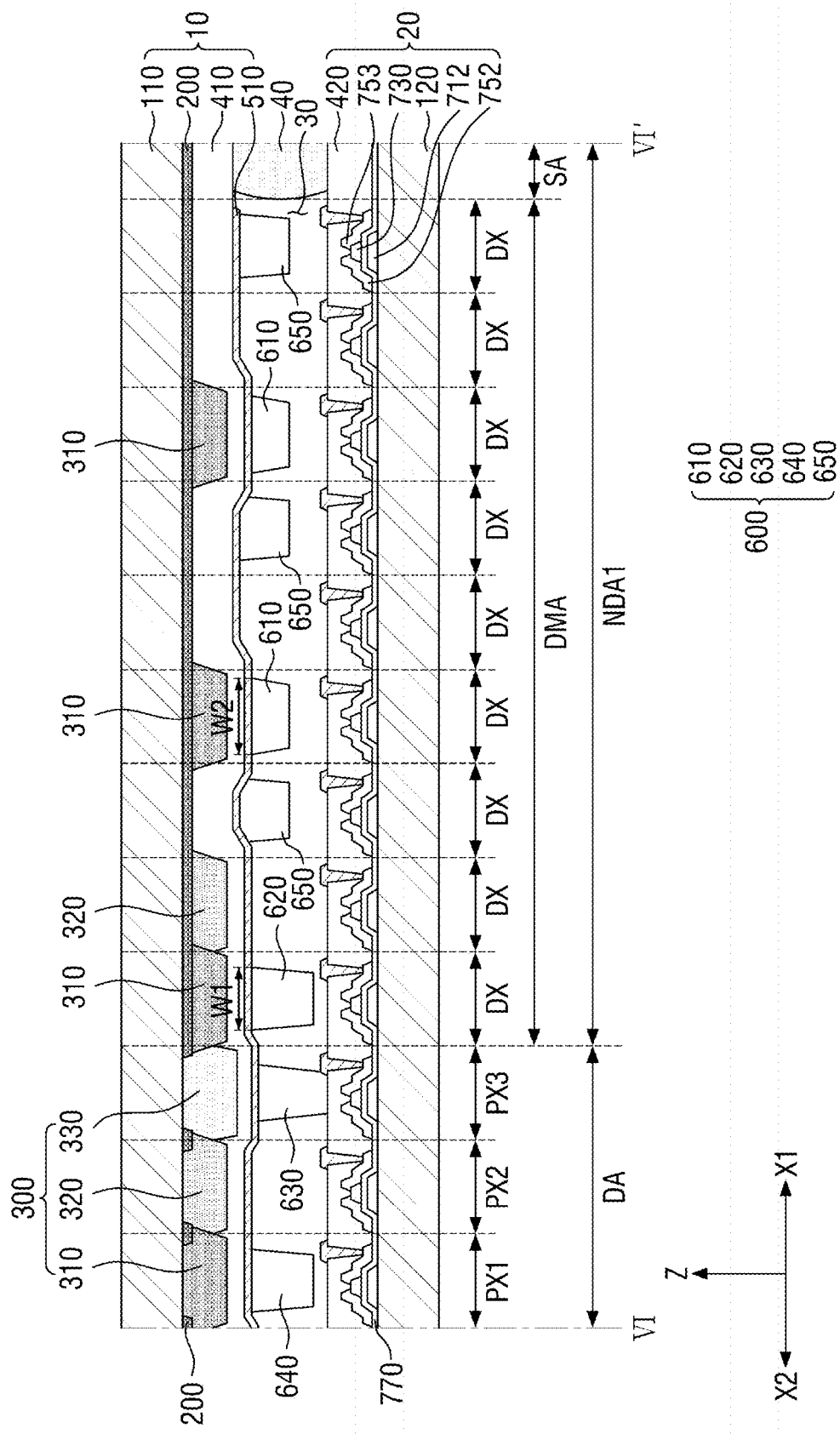
FIG. 6 is a cross-sectional view taken along line VI-VI' of FIG. 3.
Figure 7:
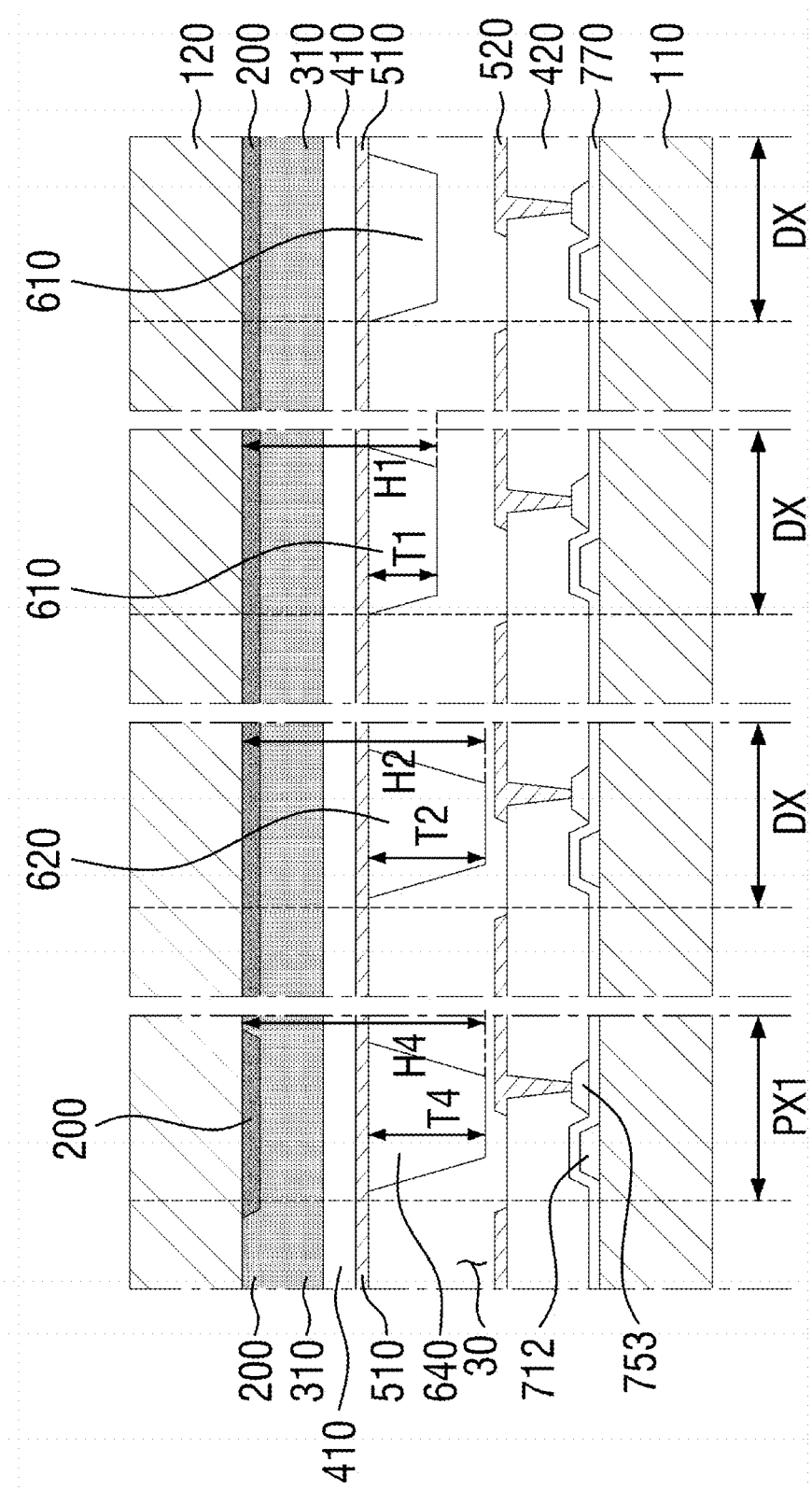
FIG. 7 shows cross-sectional views taken along lines $R_{1a}$-$R_{1a}'$, $R_{1b}$-$R_{1b}'$, $R_{1c}$-$R_{1c}'$, and $R_{1d}$-$R_{1d}'$ of FIG. 3.
Figure 8:
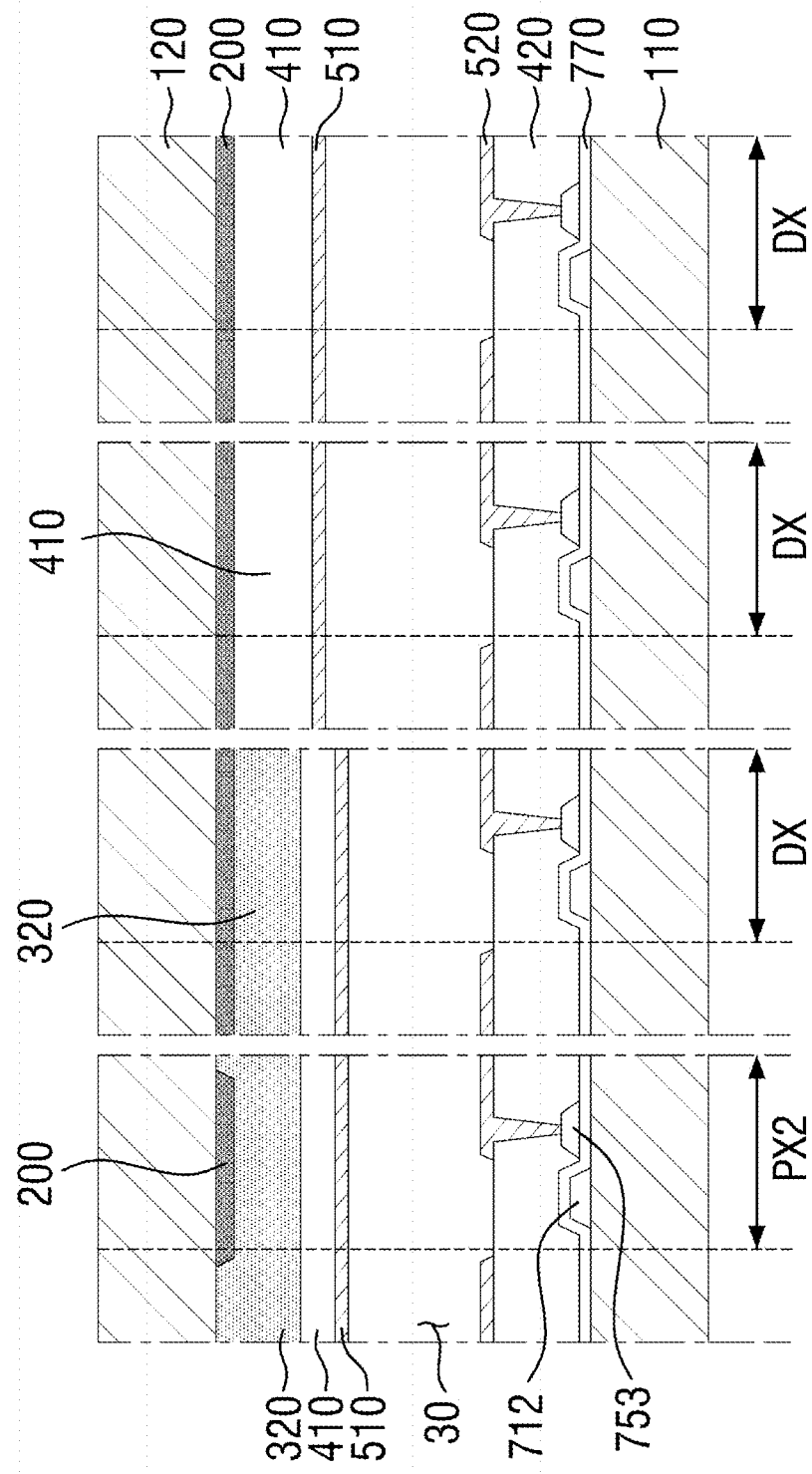
FIG. 8 shows cross-sectional views taken along lines $G_{1a}$-$G_{1a}'$, $G_{1b}$-$G_{1b}'$, and $G_{1d}$-$G_{1d}'$ of FIG. 3.
Figure 9:
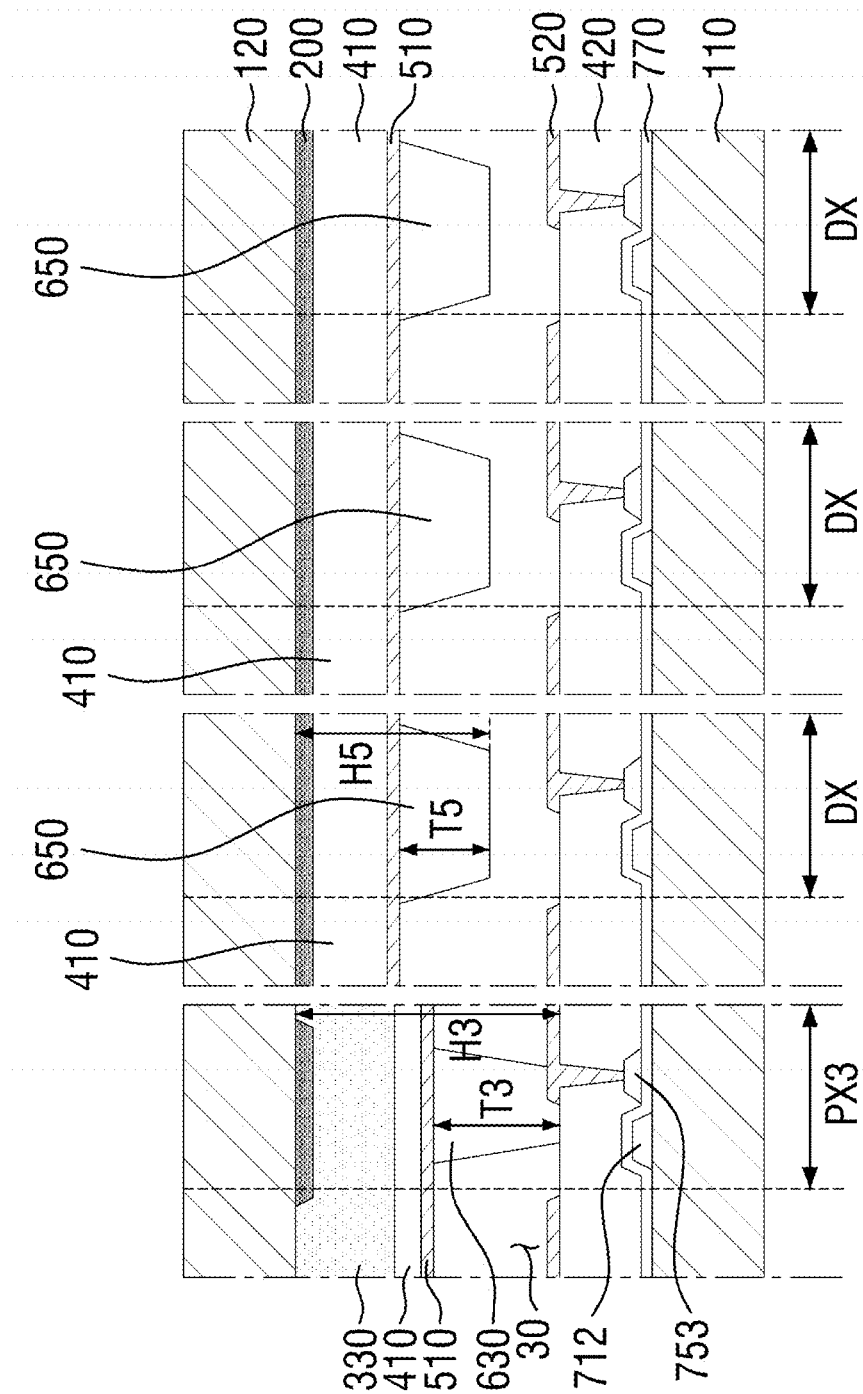
FIG. 9 shows cross-sectional views taken along lines $B_{1a}$-$B_{1a}'$, $B_{1b}$-$B_{1b}'$, $B_{1c}$-$B_{1c}'$, and $B_{1d}$-$B_{1d}'$ of FIG. 4.

FIG. 6 is a cross-sectional view taken along line VI-VI' of FIG. 3 and shows spacers 600. FIG. 7 shows cross-sectional views taken along lines $R_{1a}$-$R_{1a}'$, $R_{1b}$-$R_{1b}'$, $R_{1c}$-$R_{1c}'$, and $R_{1d}$-$R_{1d}'$ of FIG. 3. FIG. 8 shows cross-sectional views taken along lines $G_{1a}$-$G_{1a}'$, $G_{1b}$-$G_{1b}'$, $G_{1c}$-$G_{1c}'$, and $G_{1d}$-$G_{1d}'$ of FIG. 3. FIG. 9 shows cross-sectional views taken along lines $B_{1a}$-$B_{1a}'$, $B_{1b}$-$B_{1b}'$, $B_{1c}$-$B_{1c}'$, and $B_{1d}$-$B_{1d}'$ of FIG. 3.

In one exemplary embodiment, a plurality of spacers 600 may be disposed on the common electrode 510. The spacers 600 may be disposed in the non-display area NDA and the display area DA. For example, the spacers 600 may include first spacers 610 that are disposed in the dummy area DMA of the first non-display area NDA1 and have a first thickness T1. The spacers 600 may also include second spacers 620 that are disposed in the dummy area DMA and have a second thickness T2 that is greater than the first thickness T1. The first spacers 610 and the second spacers 620 may comprise the same material and may be formed at the same time by a single process. For example, the first spacers 610 and the second spacers 620 may comprise an organic material such as an epoxy resin, an acrylic resin, an imide resin, or a carcass resin. The first spacers 610 and the second spacers 620 may substantially overlap with switching elements 700 in a third direction Z. In the first non-display area NDA1, the first spacers 610 may be spaced apart from one another in the first direction (X1 and X2) and the second direction Y and may be arranged substantially in a matrix form. In the first non-display area NDA1, the second spacers 620 may be spaced apart from one another in the second direction Y.

In one exemplary embodiment, the first spacers 610 and the second spacers 620 may be disposed on the color conversion patterns of the same type. FIG. 6 illustrates an example in which the first spacers 610 and the second spacers 620 overlap with the first color conversion patterns 310 in the third direction Z, but in another example, the first spacers 610 and the second spacers 620 may overlap with the second color conversion patterns 320.

First color conversion patterns 310 overlapping with the first spacers 610 may be placed in contact with the first overcoat layer 410. Put another way the overcoat layer may directly cover the bottom surface and side surfaces of the first color conversion patterns 310 overlapping with the first spacers. For example, the second color conversion patterns 320 and the third color conversion patterns 330 may not be disposed on both sides of each of the first color conversion patterns 310 overlapping with the first spacers 610.

First color conversion patterns 310 overlapping with the second spacers 620 may be placed in contact with the second color conversion patterns 320. For example, the second color conversion patterns 320 may be disposed on first sides of the first color conversion patterns 310 overlapping with the second spacers 620, and the third color conversion patterns 330 may not be disposed on second sides of the first color conversion patterns 310 overlapping with the second spacers 620.

The second thickness T2 of the second spacers 620 may be greater than the first thickness T1 of the first spacers 610. For example, the second thickness T2 may be at least about 0.3 or 0.4 μm greater than the first thickness T1. In a non-limiting example, the second thickness T2 of the second spacers 620 may be about 1.6 μm or greater, and the first thickness T1 of the first spacers 610 may be less than about 1.6 μm.

Since the first spacers 610 have a different thickness from the second spacers 620, the first spacers 610 may form a first height H1 from the rear surface of the upper base 110, and the second spacers 620 may form a second height H2, which is greater than the first height H1, from the rear surface of the upper base 110. The first spacers 610 and the second spacers 620 may be spaced apart from the lower substrate 20. In some exemplary embodiments, a maximum width W1 of the first spacers 610 may be greater than a maximum width W2 of the second spacers 620.

The second spacers 620, the first overcoat layer 410, the first color conversion patterns 310, and the light-blocking patterns 200 may form a sufficiently large height, i.e., the second height H2, over the upper base 110 and may thus serve as effective column spacers. For example, in a case where the LCD panel DP is partially deformed by an external force or the upper substrate 10 is partially sagged by its own weight, the second spacers 620 can limit the maximum degree of deformation of the LCD panel DP. That is, the second spacers 620 may serve as sub-column spacers.

On the contrary, the first spacers 610, the first overcoat layer 410, the first color conversion patterns 310, and the light-blocking patterns 200 may not form a sufficiently large height and thus may not be able to serve as effective column spacers, but the present disclosure is not limited thereto.

In some exemplary embodiments, the spacers 600 may further include third spacers 630 that are disposed in the display area DA and have a third thickness T3 and fourth spacers 640 that are disposed in the display area DA and have a fourth thickness T4 that is smaller than the third thickness T3. The third spacers 630 and the fourth spacers 640 may comprise the same material as the first spacers 610 and the second spacers 620 and may be formed at the same time by a single process. The third spacers 630 and the fourth spacers 640 may substantially overlap with switching elements 700 in the third direction Z.

In one exemplary embodiment, the third spacers 630 may be disposed on color conversion patterns of a different type from the fourth spacers 640. For example, the third spacers 630 may be disposed on the third color conversion patterns 330, which have a relatively large maximum thickness, and the fourth spacers 640 may be disposed on the first color conversion patterns 310, which have a relatively small maximum thickness. That is, the third spacers 630 may overlap with the third color conversion patterns 330 in the third direction Z, and the fourth spacers 640 may overlap with the first color conversion patterns 310 in the third direction Z. The fourth spacers 640 may be disposed on color conversion patterns of the same type as the first spacers 610 and the second spacers 620. First color conversion patterns 310 overlapping with the fourth spacers 640 may be placed in contact with the second color conversion patterns 320 and the third color conversion patterns 330. For example, the second color conversion patterns 320 may be disposed on first sides of the first color conversion patterns 310 overlapping with the fourth spacers 640, and the third color conversion patterns 330 may be disposed on second sides of the first color conversion patterns 310 overlapping with the fourth spacers 640.

The third thickness T3 of the third spacers 630 may be greater than the fourth thickness T4 of the fourth spacers 640. For example, the third thickness T3 of the third spacers 630 may be at least about 0.3 or 0.4 μm greater than the fourth thickness T4 of the fourth spacers 640. The fourth thickness T4 of the fourth spacers 640 may be substantially the same as, or different from, the second thickness T2 of the second spacers 620. In a non-limiting example, the fourth thickness T4 of the fourth spacers 640 may be about 1.6 μm or greater. In an exemplary embodiment where the fourth thickness T4 of the fourth spacers 640 is substantially the same as the second thickness T2 of the second spacers 620, the third thickness T3 of the third spacers 630 may be greater than the second thickness T2 of the second spacers 620.

Since the third spacers 630 have a different thickness from the fourth spacers 640, the third spacers 630 may form a third height H3 from the rear surface of the upper base 110, and the fourth spacers 640 may form a fourth height H4, which is less than the third height H3, from the rear surface of the upper base 110. The third spacers 630 may be placed in contact with the lower substrate 20, and the fourth spacers 640 may be spaced apart from the lower substrate 20. In some exemplary embodiments, the fourth height H4 formed by the fourth spacers 640 may be substantially the same as the second height H2 formed by the second spacers 620. In this case, the third height H3 formed by the third spacers 630 may be greater than the second height H2 formed by the second spacers 620.

The third spacers 630, the first overcoat layer 410, and the third color conversion patterns 330 may form a sufficiently large height, i.e., the third height H3, over the upper base 110 and may thus serve as effective column spacers. For example, the third spacers 630 can maintain the gap between the upper and lower substrates 10 and 20. Specifically, the third spacers 630 can maintain the gap between the common electrode 510 of the upper substrate 10 and the pixel electrodes 520 of the lower substrate 20, i.e., a cell gap. That is, the third spacers 630 may serve as main column spacers. For example, a distance D between the common electrode 510 and the pixel electrodes 520 of green pixels (for example, the second pixels PX2) may be about 2.9 μm or greater, but the present disclosure is not limited thereto.

The fourth spacers 640, the first overcoat layer 410, and the first color conversion patterns 310 may form a sufficiently large height, i.e., the fourth height H4, over the upper base 110 and may thus serve as effective column spacers.

For example, the fourth spacers 640 may serve as sub-column spacers.

In some exemplary embodiments, the spacers 600 may further include fifth spacers 650, which are disposed in the dummy area DMA of the first non-display area NDA1 and have a fifth thickness T5. The fifth spacers 650 may comprise the same material as the first spacers 610 and the second spacers 620 and may be formed at the same time by a single process. The fifth spacers 650 may substantially overlap with the switching elements 700 in the third direction Z. In one exemplary embodiment, the fifth spacers 650 may not overlap with the color conversion pattern layer 300 in the third direction Z.

The fifth thickness T5 of the fifth spacers 650 may be smaller than the second thickness T2 of the second spacers 620. The fifth spacers 650, the first overcoat layer 410, and the light-blocking patterns 200 may form a fifth height H5 from the rear surface of the upper base 110. The fifth height H5 formed by the fifth spacers 650 may be smaller than the second height H2 formed by the second spacers 620. For example, the fifth height H5 may be at least about 0.3 or 0.4 µm smaller than the second height H2. In a non-limiting example, the fifth thickness T5 of the fifth spacers 650 may be about 1.6 µm or less. The fifth spacers 650 may be spaced apart from the lower substrate 20. The fifth spacers 650, the first overcoat layer 410, and the light-blocking patterns 200 may not form a sufficiently large height and thus may not be able to serve as effective column spacers, but the present disclosure is not limited thereto.

The lower substrate 20 will hereinafter be described. The lower substrate 20 may face the upper substrate 10. The lower substrate 20 may include a lower base 120, the switching elements 700, and the pixel electrodes 520.

The lower base 120 may be a transparent insulating substrate or film. In some exemplary embodiments, the lower base 120 may have flexibility. The backlight unit BLU may be disposed on the rear surface (i.e., the bottom surface in FIG. 5) of the lower base 120.

The switching elements 700 may be disposed on the front surface (i.e., the top surface in FIG. 5) of the lower base 120. The switching elements 700 may be disposed in the pixels PX in the display area DA and may allow or block the transmission of driving signals to the pixel electrodes 520 that will be described later. In some exemplary embodiments, the switching elements 700 may be further disposed in the dummy pixels DX in the dummy area DMA of the non-display area NDA.

For example, each of the switching elements 700 may be a thin-film transistor (TFT) including a gate 712, an active layer 730, which is disposed on the gate 712, and a drain 752 and a source 753, which are disposed on the active layer 730 and are spaced apart from each other.

The control terminals (for example, the gates 712) of the switching elements 700 may be electrically connected to gate wiring 711 and may receive a gate driving signal. The gates 712 and the gate wiring 711 may be disposed on the same layer. For example, the gates 712 and the gate wiring 711 may comprise the same material and may be formed at the same time by a single process. FIG. 3 illustrates an example in which the gates 712 protrude from the gate wiring 711, but in another example, part of the gate wiring 711 may form the gates 712.

The input terminals (for example, the drains 752) of the switching elements 700 may be electrically connected to data wiring 751 and may receive a data driving signal, and the output terminals (for example, the sources 753) of the switching elements 700 may be electrically connected to the pixel electrodes 520. The drains 752, the sources 753, and the data wiring 751 may be disposed on the same layer. For example, the drains 752, the sources 753, and the data wiring 751 may comprise the same material and may be formed at the same time by a single process. FIG. 4 illustrates an example in which the drains 752 protrude from the data wiring 751, but in another example, part of the data wiring 751 may form the drains 752.

The active layers 730 may comprise a silicon (Si)-based semiconductor material such as amorphous Si, polycrystalline Si, or monocrystalline Si or an oxide semiconductor. The active layers 730 may at least partially overlap with the gates 712 in the third direction Z. As used herein, the expression "an element overlapping with another element" denotes that the two elements overlap with each other in the third direction Z. The active layers 730 may serve as channels for the switching elements 700 and may turn on or off channels in accordance with a voltage applied to the gates 712. A gate insulating layer 770 is disposed between the active layers 730 and the gates 712 and may insulate the active layers 730 and the gates 712. The gate insulating layer 770 may be disposed across the display area DA and the non-display area NDA.

A second overcoat layer 420 may be disposed on the switching elements 700. The second overcoat layer 420 may be disposed across the display area DA and the non-display area NDA. The second overcoat layer 420 may minimize level differences caused by the elements disposed on the lower base 120, such as, for example, the switching elements 700, the gate wiring 711, and/or the data wiring 751, and may insulate the elements disposed thereabove from the elements disposed therebelow. The material of the second overcoat layer 420 is not particularly limited as long as it has excellent planarization and light transmittance characteristics. For example, the second overcoat layer 420 may comprise an organic material such as an epoxy resin, an acrylic resin, an imide resin, a carcass resin, a siloxane resin, or a silsesquioxane resin.

The pixel electrodes 520 may be disposed on the second overcoat layer 420. The pixel electrodes 520 may be field-generating electrodes that form an electric field in the liquid crystal layer 30 together with the common electrode 510. The pixel electrodes 520 may be disposed in the pixels PX and the dummy pixels DX.

The pixel electrodes 520 disposed in the pixels PX may be controlled independently of one another and may be provided with different driving signals. For example, the pixel electrodes 520 may be electrically connected to the output terminals (for example, the drains 752) of the switching elements 700 via contact holes CT, which are formed in the second overcoat layer 420. The pixel electrodes 520, like the common electrode 510, may be formed of a transparent conductive material. Although not specifically illustrated, each of the pixel electrodes 520 may have domain-dividing means. For example, each of the pixel electrodes 520 may include a plurality of fine slits, which are formed substantially radially in a plan view. Accordingly, in response to an electric field being formed between the pixel electrodes 520 and the common electrode 510, the direction in which the liquid crystal molecules 31 are realigned can be made to diversify, even within a single pixel PX, and the viewing angle properties of the LCD device 1 can be improved.

The liquid crystal layer 30 may be disposed between the upper and lower substrates 10 and 20. The liquid crystal layer 30 may be disposed in the display area DA and part of the non-display area NDA. The liquid crystal layer 30 may include a plurality of liquid crystal molecules 31 that are initially aligned. As used herein, the term "liquid crystal molecule" refers to a molecule having a liquid crystal property. In one exemplary embodiment, the liquid crystal molecules 31 have negative dielectric anisotropy and may have a long axis oriented substantially perpendicularly to a plane in their initial alignment state. For example, the angle that the long axis of the liquid crystal molecules 31 and the plane form may be about 80 degrees or more, about 86 degrees or more, about 87 degrees or more, or about 88 degrees or more, and the liquid crystal molecules 31 may have a predetermined pretilt.

The sealing member 40 may be disposed between the upper and lower substrates 10 and 20. The sealing member 40 may be disposed in the non-display area NDA and may define the sealing area SA. The sealing member 40 may bond the upper and lower substrates 10 and 20. For example, the sealing member 40 may be placed in contact with the first overcoat layer 410 of the upper substrate 10 and the second overcoat layer 420 of the lower substrate 20.

The color conversion pattern layer 300 and the spacers 600 in the edge area of the LCD device 1 on the first side X1 have been described so far. The LCD device 1 will hereinafter be described in further detail with reference to FIGS. 10 through 15.

Figure 10:
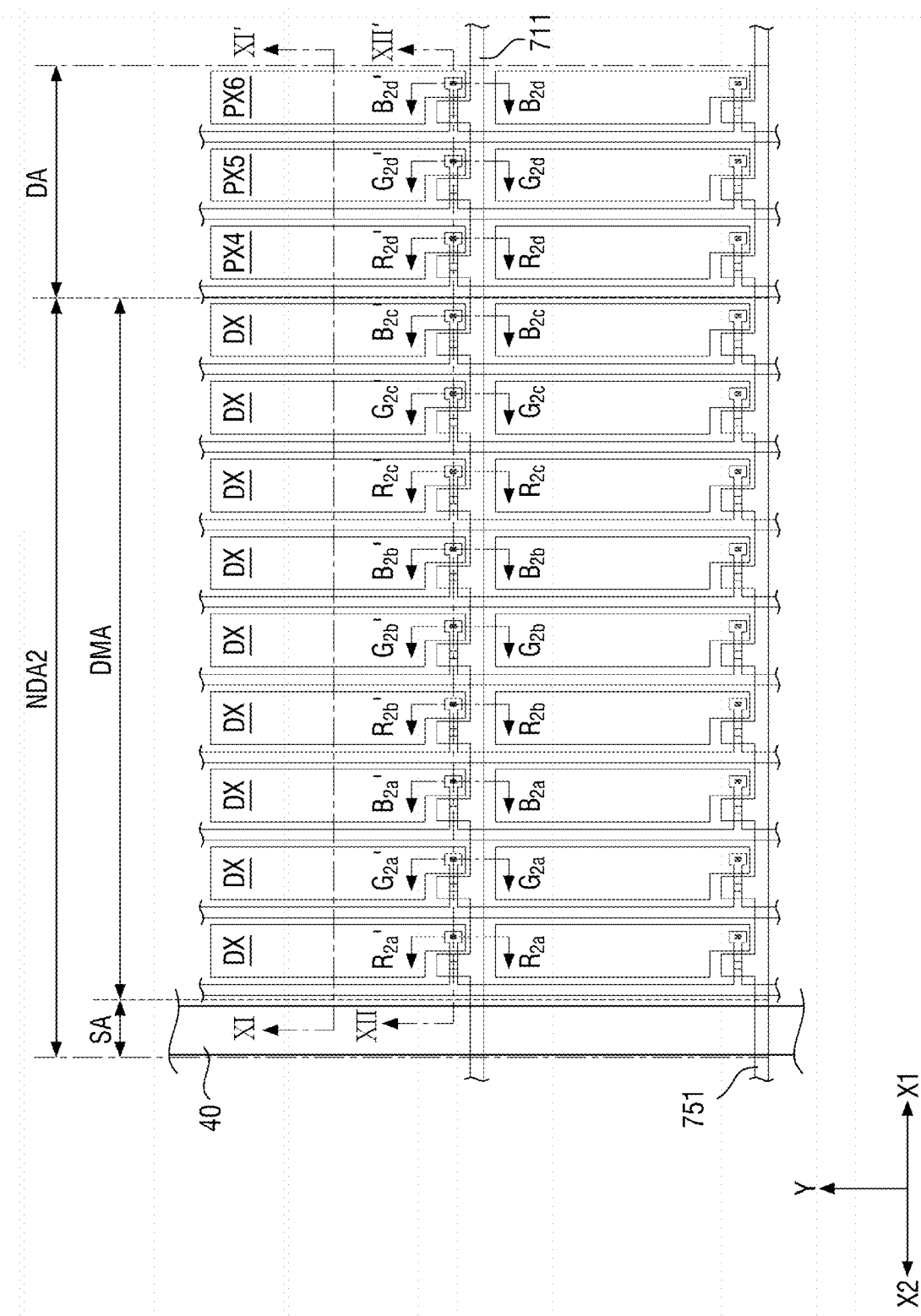
FIG. 10 is a layout view of an edge portion of the LCD device of FIG. 2 on a second side in the first direction.
Figure 11:
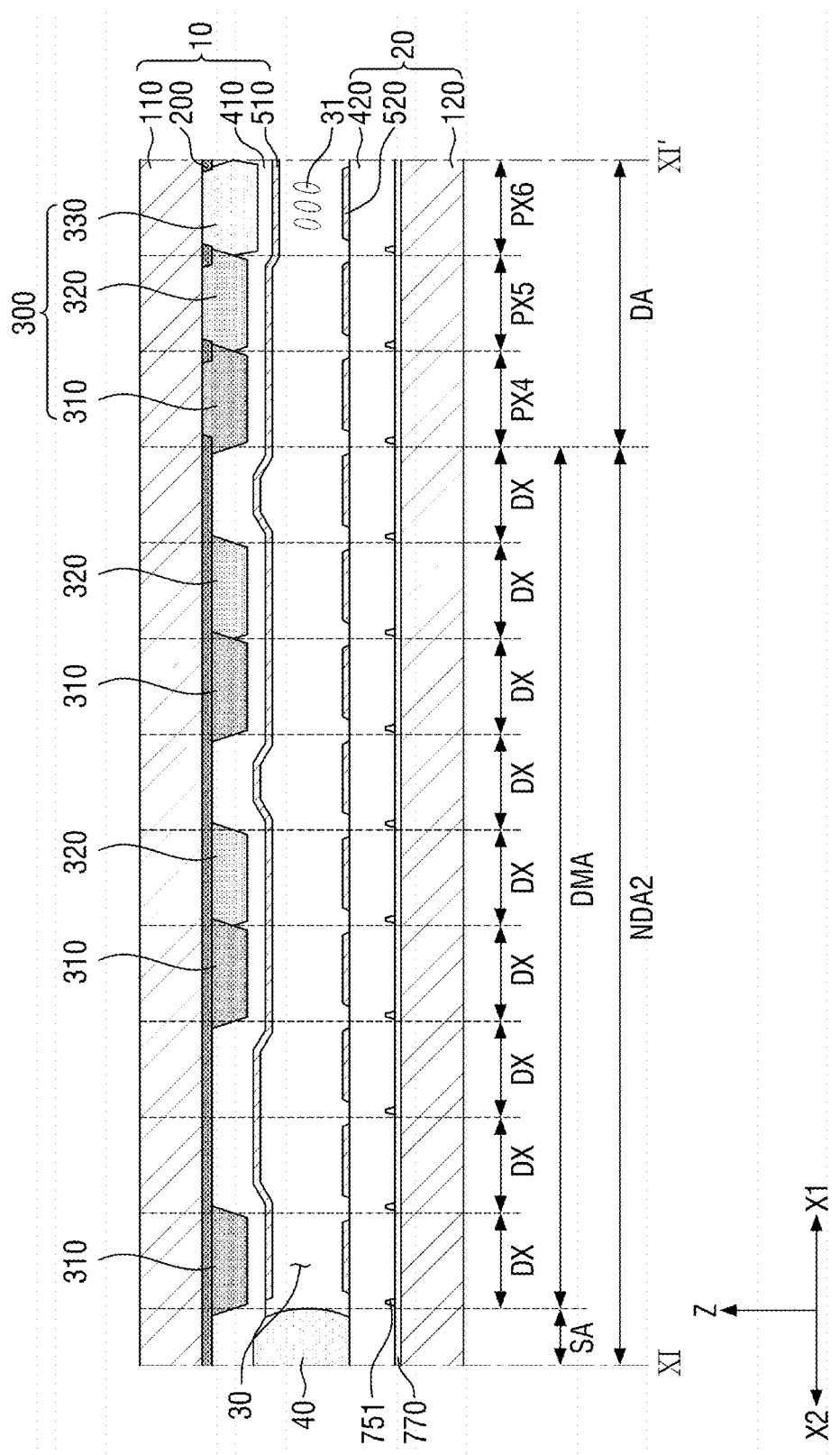
FIG. 11 is a cross-sectional view taken along line XI-XI' of FIG. 10.
Figure 12:
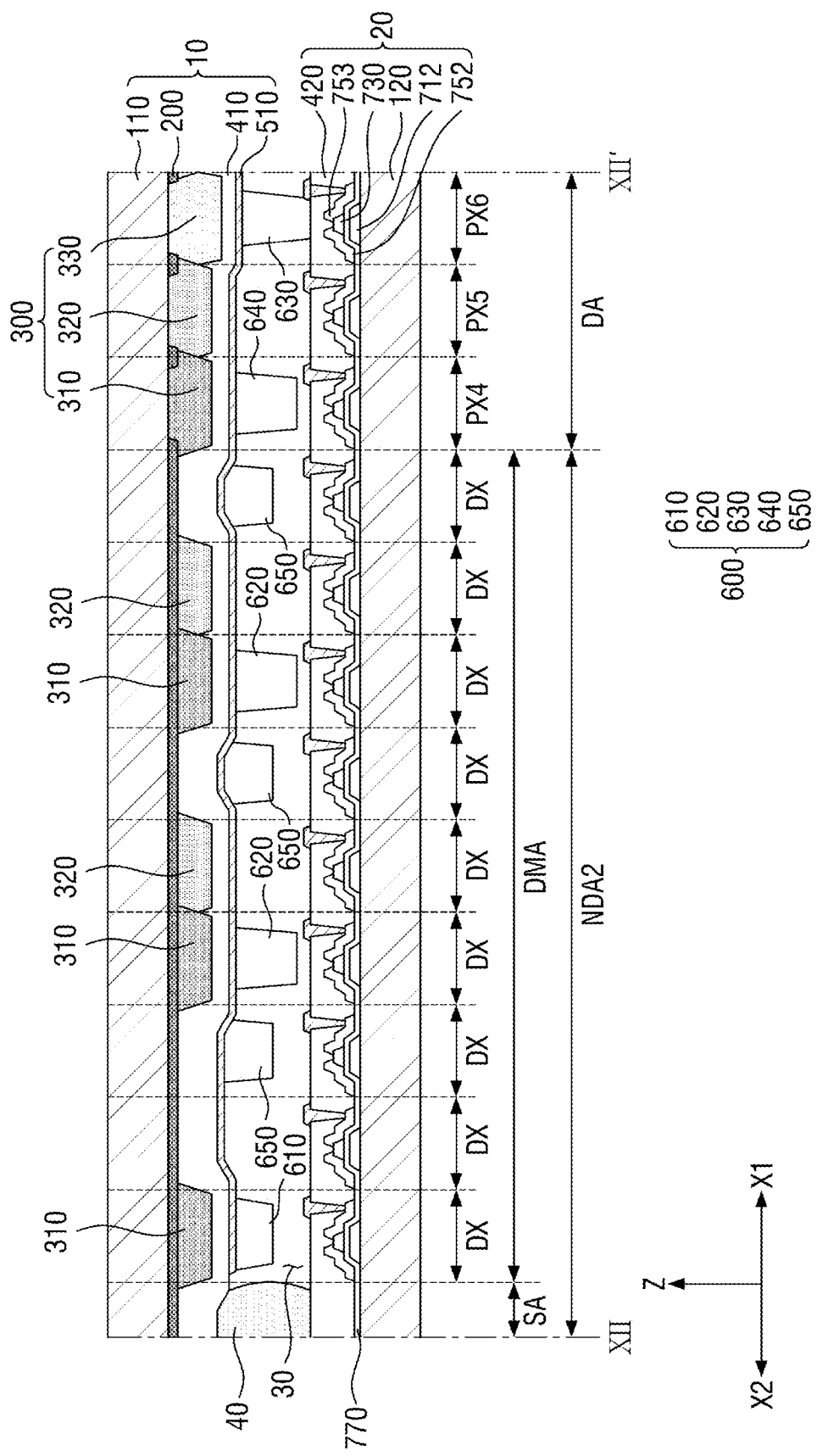
FIG. 12 is a cross-sectional view taken along line XII-XII' of FIG. 10.
Figure 13:
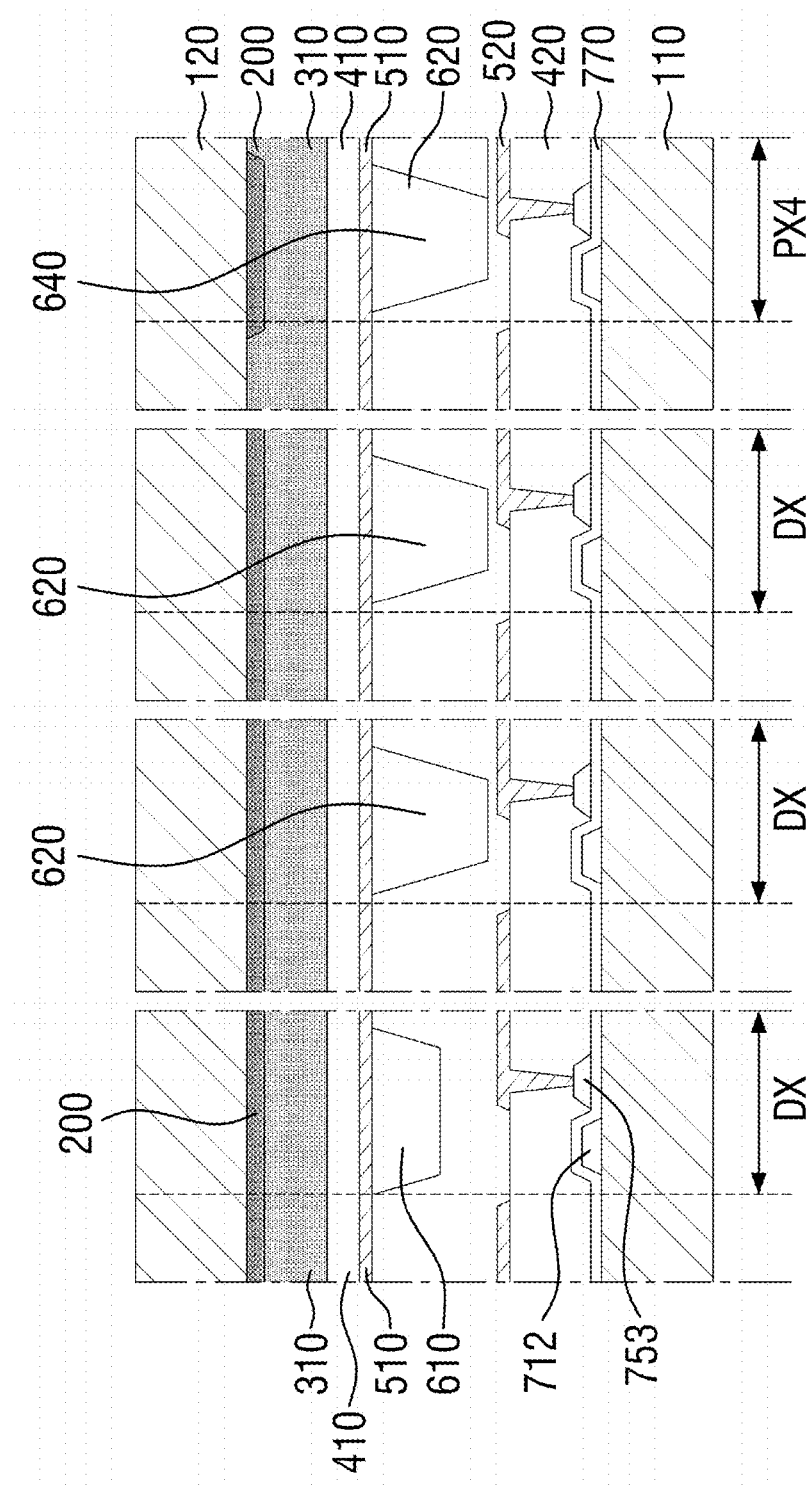
FIG. 13 shows cross-sectional views taken along lines $R_{2a}$-$R_{2a}'$, $R_{2b}$-$R_{2b}'$, $R_{2c}$-$R_{2c}'$ and $R_{2d}$-$R_{2d}'$ of FIG. 10.
Figure 14:
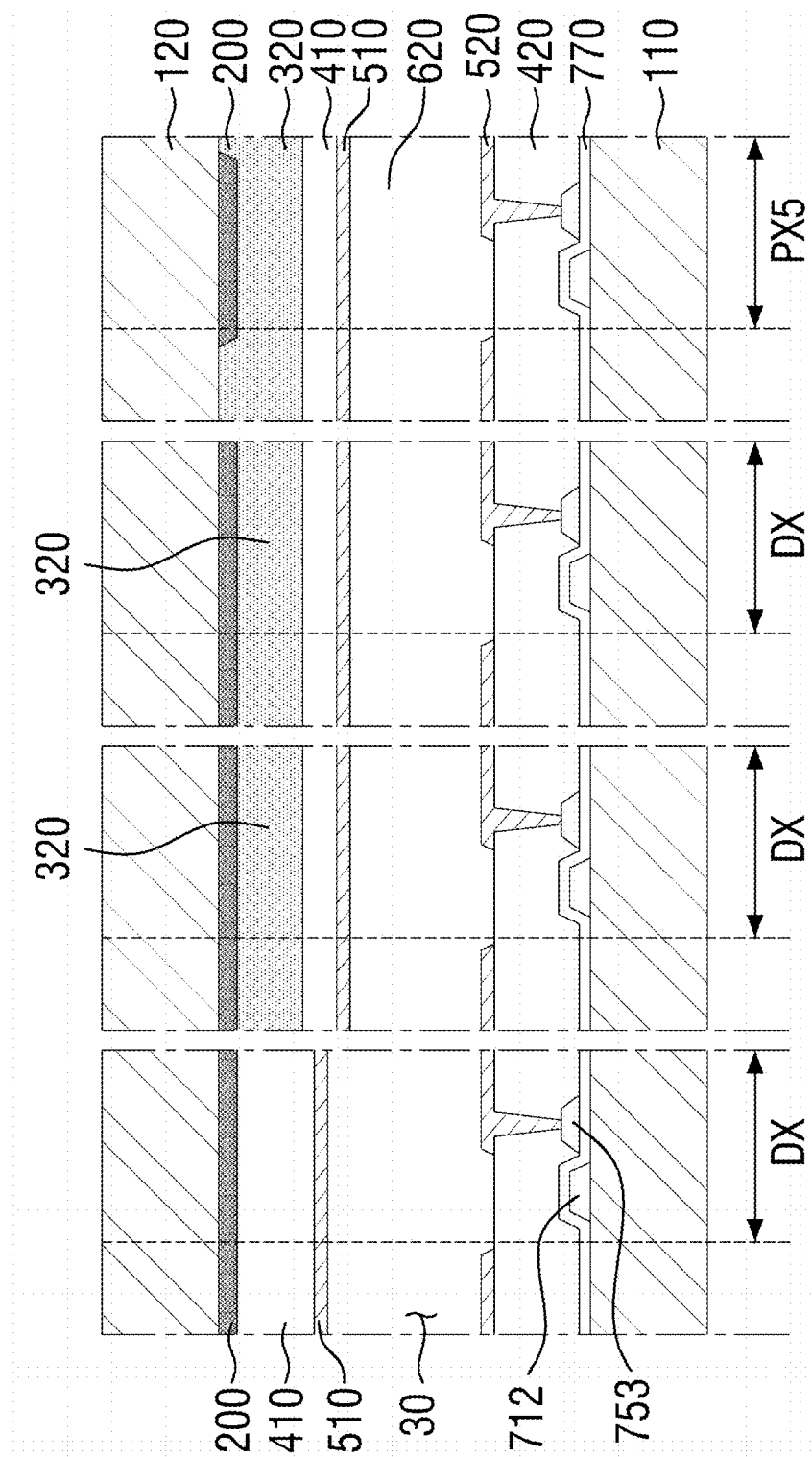
FIG. 14 shows cross-sectional views taken along lines $G_{2a}$-$G_{2a}'$, $G_{2b}$-$G_{2b}'$, $G_{1c}$-$G_{2c}'$ and $G_{2d}$-$G_{2d}'$ of FIG. 10.
Figure 15:
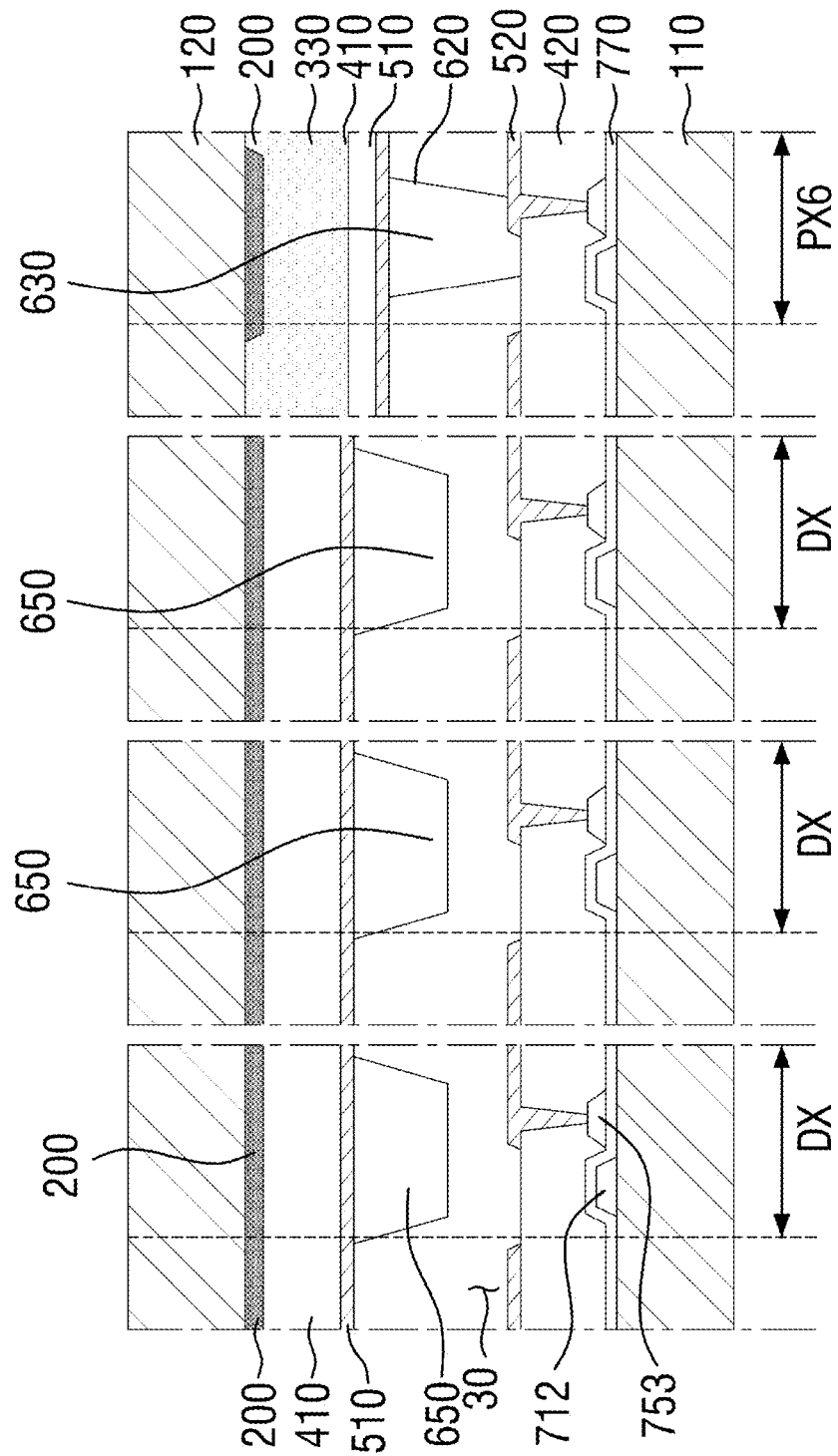
FIG. 15 shows cross-sectional views taken along lines $B_{2a}$-$B_{2a}'$, $B_{2b}$-$B_{2b}'$, $B_{2c}$-$B_{2c}'$, and $B_{2d}$-$B_{2d}'$ of FIG. 10.

FIG. 10 is a layout view of an edge portion of the LCD device of FIG. 2 on the second side in the first direction, particularly, a boundary area between the display area DA on the second side X2 (i.e., on the left side of the LCD device 1) and the second non-display area NDA2. FIG. 11 is a cross-sectional view taken along line XI-XI' of FIG. 10. FIG. 12 is a cross-sectional view taken along line XII-XII' of FIG. 10 and shows spacers 600. FIG. 13 shows cross-sectional views taken along lines $R_{2a}$-$R_{2a}'$, $R_{2b}$-$R_{2b}'$, $R_{2c}$-$R_{2c}'$, and $R_{2d}$-$R_{2d}'$ of FIG. 10. FIG. 14 shows cross-sectional views taken along lines $G_{2a}$-$G_{2a}'$, $G_{2b}$-$G_{2b}'$, $G_{2c}$-$G_{2c}'$, and $G_{2d}$-$G_{2d}'$ of FIG. 10. FIG. 15 shows cross-sectional views taken along lines $B_{2a}$-$B_{2a}'$, $B_{2b}$-$B_{2b}'$, $B_{2c}$-$B_{2c}'$, and $B_{2d}$-$B_{2d}'$ of FIG. 10.

Referring to FIGS. 1 through 15, the display area DA of the LCD device 1 may include fourth pixels PX4, which display a first color, fifth pixels PX5, which display a second color having a shorter peak wavelength than the first color, and sixth pixels PX6, which displays a third color having a shorter peak wavelength than the second color. The fourth pixels PX4, the fifth pixels PX5, and the sixth pixels PX6 may be sequentially arranged close to one another in the first direction (X1 and X2). The fourth pixels PX4 may be disposed at the end of the display area DA on the second side X2 and may adjoin the dummy area DMA. First color conversion patterns 310 may be disposed in the fourth pixels PX4 in the display area DA, second color conversion patterns 320 may be disposed in the fifth pixels PX5 in the display area DA, and third color conversion patterns 330 may be disposed in the sixth pixels PX6 in the display area DA.

For example, the first color conversion patterns 310 may be disposed at the end of the display area DA on the second side X2 (i.e., the left side in FIG. 11) of the LCD device 1. In some exemplary embodiments, color conversion patterns disposed at the end of the display area DA on the first side X1 may be of a different type from color conversion patterns disposed at the end of the display area DA on the second side X2. For example, the maximum thickness of the color conversion patterns (for example, the third color conversion patterns 330) disposed at the end of the display area DA on the first side X1 may be greater than the maximum thickness of the color conversion patterns (for example, the first color conversion patterns 310) disposed at the end of the display area DA on the second side X2.

In some exemplary embodiments, the first color conversion patterns 310 and the second color conversion patterns 320 may be disposed in the second non-display area NDA2, but the third color conversion patterns 330 may not be disposed in the second non-display area NDA2. That is, the third color conversion patterns 330 may be disposed only in the display area DA, but the present disclosure is not limited thereto. In this case, the second color conversion patterns 320 may be disposed at the end of the second non-display area NDA2 on the first side X1, and the first color conversion patterns 310 may be disposed at the end of the second non-display area NDA2 on the second side X2. That is, the color conversion patterns disposed at the end of the second non-display area NDA2 on the first side X1 may be of a different type from the color conversion patterns disposed at the end of the second non-display area NDA2 on the second side X2.

In one exemplary embodiment, the spacers 600 may include first spacers 610, which are disposed in the dummy area DMA of the second non-display area NDA2 and have a first thickness T1, and second spacers 620, which are disposed in the dummy area DMA and have a second thickness T2 that is greater than the first thickness T1. In the second non-display area NDA2, the first spacers 610 and the second spacers 620 may be spaced apart from one another in the first direction (X1 and X2) and the second direction Y and may be arranged substantially in a matrix form.

A second height H2 formed from the rear surface of the upper base 110 by the second spacers 620 may be greater than a first height H1 formed from the rear surface of the upper base 110 by the first spacers 610. The first spacers 610 and the second spacers 620 may be disposed on the first color conversion patterns 310.

In some exemplary embodiments, the spacers 600 may further include third spacers 630, which are disposed in the display area DA and have a third thickness T3, and fourth spacers 640, which are disposed in the display area DA and have a fourth thickness T4 that is smaller than the third thickness T3. A third height H3 formed from the rear surface of the upper base 110 by the third spacers 630 may be greater than a fourth height H1 formed from the rear surface of the upper base 110 by the fourth spacers 640. The third spacers 630 may be disposed on the third color conversion patterns 330, and the fourth spacers 640 may be disposed on the first color conversion patterns 310.

In some exemplary embodiments, the spacers 600 may further include fifth spacers 650, which are disposed in the dummy area DMA of the second non-display area NDA2 and have a fifth thickness T5. A fifth height H5 formed from the rear surface of the upper base 110 by the fifth spacers 650 may be smaller than the second height H2 formed from the rear surface of the upper base 110 by the second spacers 620.

The thicknesses, the functions, and the heights of the first spacers 610, the second spacers 620, and the fifth spacers 650 that are all disposed in the second non-display area NDA2 and the thicknesses, the functions, and the heights of the third spacers 630 and the fourth spacers 640 that are all disposed in the display area DA are as already described above with regard to the first non-display area NDA1, and thus, detailed descriptions thereof will be omitted.

In one exemplary embodiment, the number of second spacers 620 disposed in the first non-display area NDA1 may differ from the number of second spacers 620 disposed in the second non-display area NDA2. In one exemplary embodiment, the number of second spacers 620 disposed in the first non-display area NDA1 may be smaller than the number of second spacers 620 disposed in the second non-display area NDA2. As described above, the color conversion patterns disposed at the end of the display area DA on the first side X1 may be of a different type, and may have a different thickness, from the color conversion patterns disposed at the end of the display area DA on the second side X2.

In the LCD device 1, the number of second spacers 620 that are disposed at the end of the first non-display area NDA1 on the first side X1 and can serve as effective column spacers is different from the number of second spacers 620 that are disposed at the end of the display area DA on the second side X2. Thus, the color conversion pattern layer 300 may have an asymmetric structure in the display area DA, and as a result, edge stain defects can be improved.

In a non-limiting example, the second spacers 620 in the first non-display area NDA1 are arranged in a row, and the second spacers 620 in the second non-display area NDA2 may be arranged in two rows. For example, in a cross section of the LCD device 1 or the LCD panel DP, cut along the first direction (X1 and X2), there may exist one second spacer 620 forming an effective height in the first non-display area NDA1 and two second spacers 620 forming an effective height in the second non-display area NDA2. As described above, in order to form an effective height, the second thickness T2 of the second spacers 620 may be about 1.6 µm or greater.

Also, the sum of the numbers of first color conversion patterns 310 and second color conversion patterns 320 in the first non-display area NDA1 may differ from the sum of the numbers of first color conversion patterns 310 and second color conversion patterns 320 in the second non-display area NDA2. In one exemplary embodiment, the sum of the numbers of first color conversion patterns 310 and second color conversion patterns 320 in the first non-display area NDA1 may be smaller than the sum of the numbers of first color conversion patterns 310 and second color conversion patterns 320 in the second non-display area NDA2.

The LCD device 1 will hereinafter be described in further detail with reference an Example of the present disclosure and a comparative example.

EXAMPLE

An LCD panel according to an Example of the present disclosure was fabricated in accordance with the above-mentioned exemplary embodiment of the present disclosure.

Specifically, a plurality of spacers having different thicknesses in a non-display area were formed. The thickness of spacers formed on red color filters with no other color filters adjacent thereto, i.e., first spacers, was about 1.2 µm, and the thickness of spacers formed on red color filters with green color filters adjacent thereto was about 1.6 µm. The first spacers and the second spacers were formed by a single process using the same material. Second spacers with a thickness of about 1.6 µm were formed in a row in a right-side edge portion (i.e., a first non-display area) of the LCD panel according to an Example of the present disclosure, and second spacers with a thickness of about 1.6 µm were formed in two rows in a left-side edge portion (i.e., a second non-display area) of the LCD panel according to an Example of the present disclosure.

Then, a backlight unit was disposed at the rear of the LCD panel according to an Example of the present disclosure, and images were captured from the edge portions of the LCD panel according to an Example of the present disclosure by transmitting light through the LCD panel according to an Example. The captured images are as shown in FIG. 16.

COMPARATIVE EXAMPLE

An LCD panel according to a comparative example was fabricated using the same method used to fabricate the LCD panel according to an Example of the present disclosure except that spacers having a height of 1.6 µm or greater were not formed. Then, a backlight unit was disposed at the rear of the LCD panel according to a comparative example, and images were captured from the edge portions of the LCD panel according to a comparative example by transmitting light through the LCD panel according to a comparative example. The captured images are as shown in FIG. 17.

Figure 16:
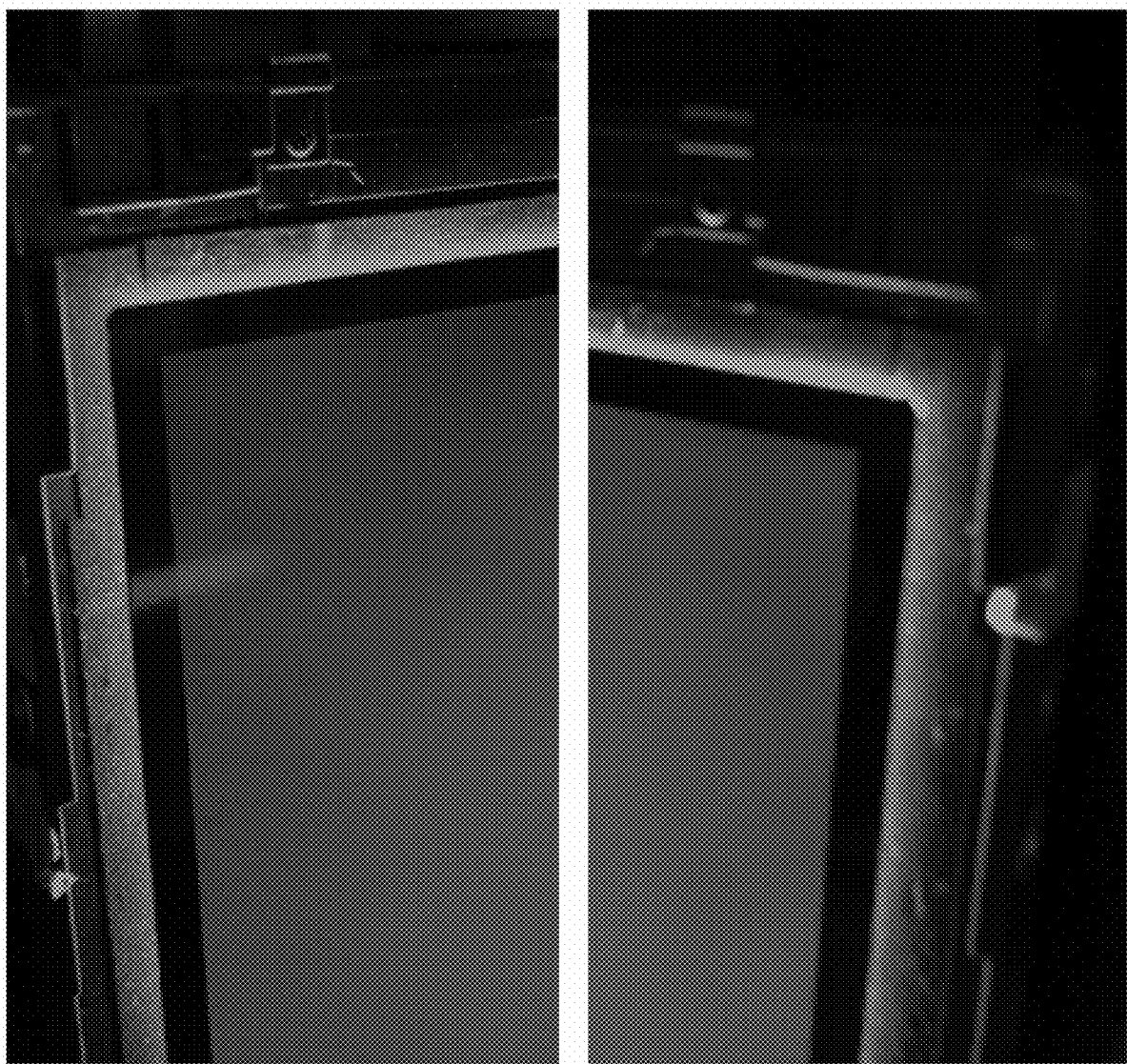
FIG. 16 shows images of the edges of an LCD device according to an Example.

Referring to FIG. 16, neither light leakage nor stains are detected from the edge portions of the LCD panel according to an Example of the present disclosure.

Figure 17:
FIG. 17 shows images of the edges of an LCD device according to a comparative example.

On the other hand, referring to FIG. 17, dark stains are detected from the edge portions of the LCD panel according to a comparative example.

Referring to FIGS. 16 and 17, defects or stains can be improved depending on the number of spacers (i.e., second spacers) disposed in the non-display area of an LCD panel to form an effective height.

According to the aforementioned and other exemplary embodiments of the present disclosure, an LCD device capable of suppressing the occurrence of defects such as stains on the edges thereof so as to improve display quality can be provided.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display panel, comprising:
a display area;
a non-display area that surrounds the display area and comprising a first non-display area disposed on a first side, in a first direction, of the display area and a second non-display area disposed on a second side, in the first direction, of the display area;
a first substrate comprising a first base and a plurality of spacers disposed on a first surface of the first base;
a second substrate disposed on and spaced apart from the first substrate; and
a display element disposed between the first substrate and the second substrate;
wherein the spacers comprise:
first spacers disposed in the non-display area and having a first thickness, and
second spacers disposed in the non-display area, having a second thickness that is greater than the first thickness, and comprising the same material as the first spacers, and
wherein a number of second spacers disposed in the first non-display area is different from a number of second spacers disposed in the second non-display area.

2. The display panel of claim 1, wherein:
the first substrate further comprises a color conversion pattern layer disposed between the first base and the spacers, the color conversion pattern layer comprises first color conversion patterns that selectively transmit a first color through the first color conversion patterns, second color conversion patterns that selectively transmit a second color, different from the first color, through the second color conversion patterns, and third color conversion patterns that selectively transmit a third color having a shorter peak wavelength than the first color and the second color through the third color conversion patterns, and the first color conversion patterns, the second color conversion patterns, and the third color conversion patterns form repeating units that are arranged one after another in the first direction.

3. The display panel of claim 2, wherein:
the first color conversion patterns and the second color conversion patterns are disposed in the non-display area, and
the third color conversion patterns are not disposed in the non-display area.

4. The display panel of claim 2, wherein;
the third color conversion patterns are disposed at an end of the display area on the first side in the first direction,
the first color conversion patterns are disposed at an end of the display area on the second side in the first direction,
a maximum thickness of the third color conversion patterns is greater than a maximum thickness of the first color conversion patterns, and
a number of second spacers disposed in the first non-display area is smaller than a number of second spacers disposed in the second non-display area.

5. The display panel of claim 2, wherein:
the first color conversion patterns and the second color conversion patterns are disposed in both the first non-display area and the second non-display area,
among the first color conversion patterns and the second conversion patterns disposed in the first non-display area, the first color conversion patterns are positioned at an end of the first non-display area on the second side in the first direction, and
among the first color conversion patterns and the second conversion patterns disposed in the second non-display area, the second color conversion patterns are positioned at an end of the second non-display area on the first side in the first direction.

6. The display panel of claim 5, wherein:
among the first color conversion patterns and the second color conversion patterns disposed in the first non-display area, the first color conversion patterns are positioned at end of the first non-display area on the first side in the first direction, and
among the first color conversion patterns and the second color conversion patterns disposed in the second non-display area, the first color conversion patterns are positioned at end of the second non-display area on the second side in the first direction.

7. The display panel of claim 2, wherein:
the first spacers and the second spacers both overlap with the first color conversion patterns, and
a difference between the first thickness and the second thickness is 0.4 µm or greater.

8. The display panel of claim 2, wherein:
the first spacers and the second spacers both overlap with the first color conversion patterns, and
a maximum width of the first spacers is greater than a maximum width of the second spacers.

9. The display panel of claim 2, wherein the spacers further comprise third spacers disposed in the display area, having a third thickness that is greater than the second thickness, and comprising the same material as the second spacers.

10. The display panel of claim 9, wherein:
the spacers further comprise fourth spacers disposed in the display area, having a fourth thickness that is smaller than the third thickness, and comprising the same material as the third spacers, and
a difference between the first thickness and the second thickness is 0.4 µm or greater.

11. The display panel of claim 10, wherein:
the first spacers, the second spacers, and the fourth spacers all overlap with the first color conversion patterns, and
the third spacers overlap with the third color conversion patterns.

12. The display panel of claim 11, wherein:
the first substrate further comprise a first overcoat layer disposed between the color conversion pattern layer and the spacers,
the overcoat layer covers a bottom surface and a side surface of the first color conversion patterns overlapping with the first spacers, and
the first color conversion patterns overlapping with the second spacers and the fourth spacers are placed in contact with the second color conversion patterns.

13. The display panel of claim 11, wherein:
the spacers further comprise fifth spacers disposed in the non-display area, not overlapping with the color conversion pattern layer, and comprising the same material as the second spacers,
the second spacers form a second height from the first surface of the first base, and
the fifth spacers form a fifth height that is smaller than the second height from the first surface of the first base.

14. The display panel of claim 1, wherein:
the spacers further comprise third spacers disposed in the display area and comprising the same material as the second spacers,
the first spacers form a first height from the first surface of the first base,
the second spacers form a second height that is greater than the first height from the first surface of the first base,
the third spacers form a third height that is greater than the second height from the first surface of the first base, and
the third spacers are placed in contact with the second substrate.

15. The display panel of claim 1, wherein:
a thickness of the second spacers is 1.6 µm or greater, and
in a cross section of display panel, cut along the first direction, one second spacer is in the first non-display area and two second spacers are in the second non-display area.

16. The display panel of claim 1, further comprising:
a sealing member bonding the first substrate and the second substrate and disposed in the non-display area, wherein:
the first substrate further comprises a color conversion pattern layer disposed between the first base and the spacers, a first overcoat layer disposed between the color conversion pattern layer and the spacers, and a common electrode disposed between the first overcoat layer and the spacers, the second substrate comprises a second base, switching elements disposed on a first surface of the second base, a second overcoat layer disposed on the switching elements, and pixel electrodes disposed on the second overcoat layer, and the sealing member is placed in contact with the first overcoat layer and the second overcoat layer.

17. A display panel, comprising:

a display area;

a non-display area surrounding the display area and comprising a first non-display area disposed on a first side, in a first direction, of the display area and a second non-display area disposed on a second side, in the first direction, of the display area;

a first substrate comprising a first base and a color conversion pattern layer disposed on a first surface of the first base;

a second substrate disposed on and spaced apart from the first substrate; and a display element disposed between the first substrate and the second substrate;

wherein the color conversion pattern layer comprises:

first color conversion patterns disposed in the display area and the non-display area that selectively transmit a first color through the first color conversion patterns, second color conversion patterns disposed in the display area and the non-display area that selectively transmit a second color different from the first color through the second color conversion patterns, and third color conversion patterns disposed only in the display area that selectively transmit a third color, having a shorter peak wavelength than the first color and the second color, through the third color conversion patterns, and wherein a sum of numbers of first color conversion patterns and second color conversion patterns in the first non-display area is different from a sum of numbers of first color conversion patterns and second color conversion patterns in the second non-display area, wherein:

the third color conversion patterns are disposed closer than the first and second color conversion patterns to an end of the display area on the first side in the first direction, the first color conversion patterns are disposed closer than the second and third color conversion patterns to an end of the display area on the second side in the first direction.

18. The display panel of claim 17, wherein:

a sum of the numbers of first color conversion patterns and second color conversion patterns in the first non-display area is less than the sum of the numbers of first color conversion patterns and second color conversion patterns in the second non-display area.

19. A display panel, comprising:

a display area comprising a plurality of pixels;

a dummy area surrounding the display area and comprising a plurality of dummy pixels;

a first substrate comprising a first base and a plurality of spacers disposed on a first surface of the first base;

a second substrate disposed on and spaced apart from the first substrate; and a display element disposed between the first substrate and the second substrate;

wherein a number of spacers having a thickness of 1.6 µm or greater and disposed in part of the dummy area on a first side, in a first direction, of the display area, is different from a number of spacers having a thickness of 1.6 µm or greater and disposed in part of the dummy area on a second side, in the first direction, of the display area.

20. The display panel of claim 19, wherein:

the first substrate further comprises a first field-generating electrode disposed between the first base and the spacers, the second substrate comprises a second field-generating electrode spaced apart from the first field-generating electrode, and a minimum distance between the first field-generating electrode and the second field-generating electrode in the display area is 2.9 µm or greater.

\* \* \* \* \*